United States Patent
Subrahmanya et al.

(10) Patent No.: US 11,374,859 B2
(45) Date of Patent: Jun. 28, 2022

(54) FLOW TABLE PROGRAMMING USING FLOW MISS METADATA AND BURST ACTION ASSIST VIA CPU OFFLOAD

(71) Applicant: Pensando Systems Inc., Milpitas, CA (US)

(72) Inventors: Sameer Kittur Subrahmanya, Fremont, CA (US); Vijay Sampath, Milpitas, CA (US); Sarat Kamisetty, Fremont, CA (US); Pirabhu Raman, Fremont, CA (US); Krishna Doddapaneni, Cupertino, CA (US); Raghava Kodigenahalli Sivaramu, Fremont, CA (US)

(73) Assignee: Pensando Systems, Inc., Milpitas, CA (US)

( * ) Notice: Subject to any disclaimer, the term of this patent is extended or adjusted under 35 U.S.C. 154(b) by 115 days.

(21) Appl. No.: 16/985,054

(22) Filed: Aug. 4, 2020

(65) Prior Publication Data
US 2022/0045940 A1 Feb. 10, 2022

(51) Int. Cl.
*H04L 12/50* (2006.01)
*H04L 45/00* (2022.01)
*G06F 16/907* (2019.01)
*H04L 9/06* (2006.01)
*H04L 9/08* (2006.01)

(52) U.S. Cl.
CPC ............ *H04L 45/38* (2013.01); *G06F 16/907* (2019.01); *H04L 9/0643* (2013.01); *H04L 9/0861* (2013.01)

(58) Field of Classification Search
CPC ...................................................... H04L 12/50
USPC ............................................................ 370/329
See application file for complete search history.

(56) References Cited

U.S. PATENT DOCUMENTS

| | | | |
|---|---|---|---|
| 9,244,843 B1 | 1/2016 | Michels et al. | |
| 9,548,920 B2 | 1/2017 | Narasimha et al. | |
| 10,469,388 B2 | 11/2019 | Hu et al. | |
| 10,601,732 B1 | 3/2020 | Peterson et al. | |
| 10,621,080 B2 | 4/2020 | Jain et al. | |
| 2006/0136570 A1* | 6/2006 | Pandya .................. | H04L 69/16 709/217 |

(Continued)

OTHER PUBLICATIONS

Fu, Wenwen et al. "FAS: Using FPGA to Accelerate and Secure SDN Software Switches", Research Article, Security and Communication Networks, vol. 2018, Article ID 5650205, Published Jan. 17, 2018, 13 pgs.

(Continued)

*Primary Examiner* — Dang T Ton
(74) *Attorney, Agent, or Firm* — Loza & Loza LLP

(57) ABSTRACT

A network appliance can queue a first packet and a second packet of a network traffic flow in an input queue of a match-action pipeline. The match-action pipeline can be implemented via a packet processing circuit of the network appliance and can be configured to process a plurality of network traffic flows. Submitting the first packet to the match-action pipeline can cause a first flow miss. The second packet can be moved to a burst queue of the network appliance and a match-action configuration can be generated based on the first packet. The second packet can be moved from the burst queue to the input queue after the match-action pipeline is configured with the match-action configuration. The match-action pipeline can then process the second packet.

20 Claims, 19 Drawing Sheets

(56) References Cited

U.S. PATENT DOCUMENTS

2014/0098669 A1   4/2014  Garg et al.
2014/0369348 A1  12/2014  Zhang et al.
2015/0169457 A1   6/2015  Jackson

OTHER PUBLICATIONS

Isyaku, Babangida et al. "Software Defined Networking Flow Table Management of OpenFlow Switches Performance and Security Challenges: A Survey", Future Internet 2020, 12, 147; www.mdpi.com/journal/futureinternet, 30 pgs.
P4: "P4 Language Tutorial", https://p4.org/assets/P4_tutorial_01_basics.gslide.pdf, 2017, 55 pgs.
Kunźiar, Maciej et al. "What You Need to Know About SDN Flow Tables", http://www.diva-portal.org/smash/get/diva2:785946/FULLTEXT01.pdf, retrieved Feb. 2, 2021, 12 pgs.
Zhang, Cheng, "B-Cache: A Behavior-Level Caching Framework for the Programmable Data Plane", 2018 IEEE Symposium on Computers and Communications (ISCC), (2018), 7 pgs.
Yazdinejad, Abbas et al. "A high-performance framework for a network programmable packet processor using P4 and FPGA", Journal of Network and Computer Applications, 156, (2020), 16 pgs.
European Search Report for EP21189582.6 dated Dec. 20, 2021, 2 pgs.
Written Opinion for European Search Report, EP21189582.6, dated Dec. 20, 2021, 5 pgs.

\* cited by examiner

FLOW TABLE PROGRAMMING USING FLOW MISS METADATA AND BURST ACTION ASSIST VIA CPU OFFLOAD

TECHNICAL FIELD

The embodiments relate to computer networks, network appliances, network switches, network routers, P4 packet processing pipelines, and programmable packet processing pipelines implemented using special purpose circuitry.

BACKGROUND

In data networks, network appliances such as switches, routers, and network interface cards receive packets at input interfaces, process the received packets, and then forward the packets to one or more output interfaces. It is important that such network appliances operate as quickly as possible in order to keep pace with a high rate of incoming packets. One challenge associated with network appliances relates to providing the flexibility to adapt to changes in desired feature sets, networking protocols, operating systems, applications, and hardware configurations.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method includes queueing a first packet and a second packet of a network traffic flow in an input queue of a match-action pipeline implemented via a packet processing circuit of a network appliance configured to process a plurality of network traffic flows, causing a first flow miss by submitting the first packet to the match-action pipeline, and moving the second packet to a burst queue of the network appliance. The method can also include generating a match-action configuration based on the first packet, moving the second packet from the burst queue to the input queue after configuring the match-action pipeline with the match-action configuration, and processing, by the match-action pipeline, the second packet.

Another aspect of the subject matter described in this disclosure can be implemented in another method. The method includes submitting a packet of a network traffic flow to a match-action unit of a match-action pipeline implemented via a packet processing circuit of a network appliance configured to process a plurality of network traffic flows, generating a packet header vector based on the packet, the match-action unit configured generate a plurality of packet header vectors by parsing a plurality of packets, and generating a key derivation metadata that includes a hash value, a key derivation circuit configured to generate a plurality of hash values for the plurality of packet header vectors. The method can also include detecting a flow miss indicating the match-action pipeline requires configuration for the network traffic flow, augmenting the packet header vector with the key derivation metadata, generating a match-action configuration using the packet header vector augmented with the key derivation metadata, and configuring the match-action pipeline with the match-action configuration.

A further aspect of the subject matter described in this disclosure can be implemented in a network appliance configured to process a plurality of network traffic flows. The network appliance includes a packet processing circuit implementing a match-action pipeline, and a burst queue. The network appliance can be configured to receive a first packet and a second packet of a network traffic flow, cause a flow miss by submitting the first packet to the match-action pipeline, and place the second packet on the burst queue. The network appliance can also be configured to generate a match-action configuration based on the first packet, and process the second packet using the match-action pipeline after configuring the match-action pipeline with the match-action configuration.

In some implementations of the methods and devices, a method can include redirecting the first packet to a CPU receive queue wherein a CPU core is configured to generate the match-action configuration. In some implementations of the methods and devices, the first packet is moved to the CPU receive queue via the burst queue. In some implementations of the methods and devices, the second packet is moved from the burst queue to the input queue by an extended packet processing pipeline. In some implementations of the methods and devices, the method includes submitting a first packet header vector based on the first packet to an extended packet processing pipeline implemented via a pipeline circuit, and submitting a second packet header vector based on the second packet to the extended packet processing pipeline.

In some implementations of the methods and devices, an extended packet processing pipeline is configured to implement a plurality of burst queues that include the burst queue. In some implementations of the methods and devices, the method includes generating a packet header vector from the first packet, producing a hash value using the packet header vector, and selecting the burst queue using a plurality of bits of the hash value, the network appliance configured to implement a plurality of burst queues. In some implementations of the methods and devices, the second packet is moved to the burst queue after causing a second flow miss in the match-action pipeline. In some implementations of the methods and devices, a policy change causes the first packet and the second packet to be sent to the burst queue.

In some implementations of the methods and devices, the match-action pipeline is a p4 pipeline. In some implementations of the methods and devices, the network appliance includes a CPU core configured to generate the match-action configuration using the packet header vector augmented with the key derivation metadata. In some implementations of the methods and devices, the key derivation metadata includes a forward flow hash value for a forward flow of the network traffic flow. In some implementations of the methods and devices, the key derivation metadata includes a reverse flow hash value for a reverse flow of the network traffic flow.

In some implementations of the methods and devices, the method includes avoiding a race condition between the match-action configuration and a second match-action configuration via a flow entry state data, the network appliance configured to implement the flow entry state data. In some implementations of the methods and devices, the network appliance includes an extended packet processing pipeline implemented via a pipeline circuit, and the extended packet processing pipeline is configured to generate the match-action configuration using the packet header vector augmented with the key derivation metadata. In some implementations of the methods and devices, the extended packet processing pipeline is configured to write traffic flow management data to a memory via a direct memory access operation, the memory used by at least one CPU core of the network appliance.

In some implementations of the methods and devices, the method includes queueing a match-action pipeline configuration operation on a serialization queue, the network appliance configured to implement a plurality of serialization queues and to serialize a plurality of match-action operations via the plurality of serialization queues, and configuring the match-action pipeline with the match-action configuration by processing the match-action pipeline configuration operation.

In some implementations of the methods and devices, the method further includes queueing the packet and a second packet of the network traffic flow in an input queue of the match-action pipeline, moving the second packet to a burst queue of the network appliance after detecting the flow miss, moving the second packet from the burst queue to the input queue after configuring the match-action pipeline with the match-action configuration, and processing, by the match-action pipeline, the second packet.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
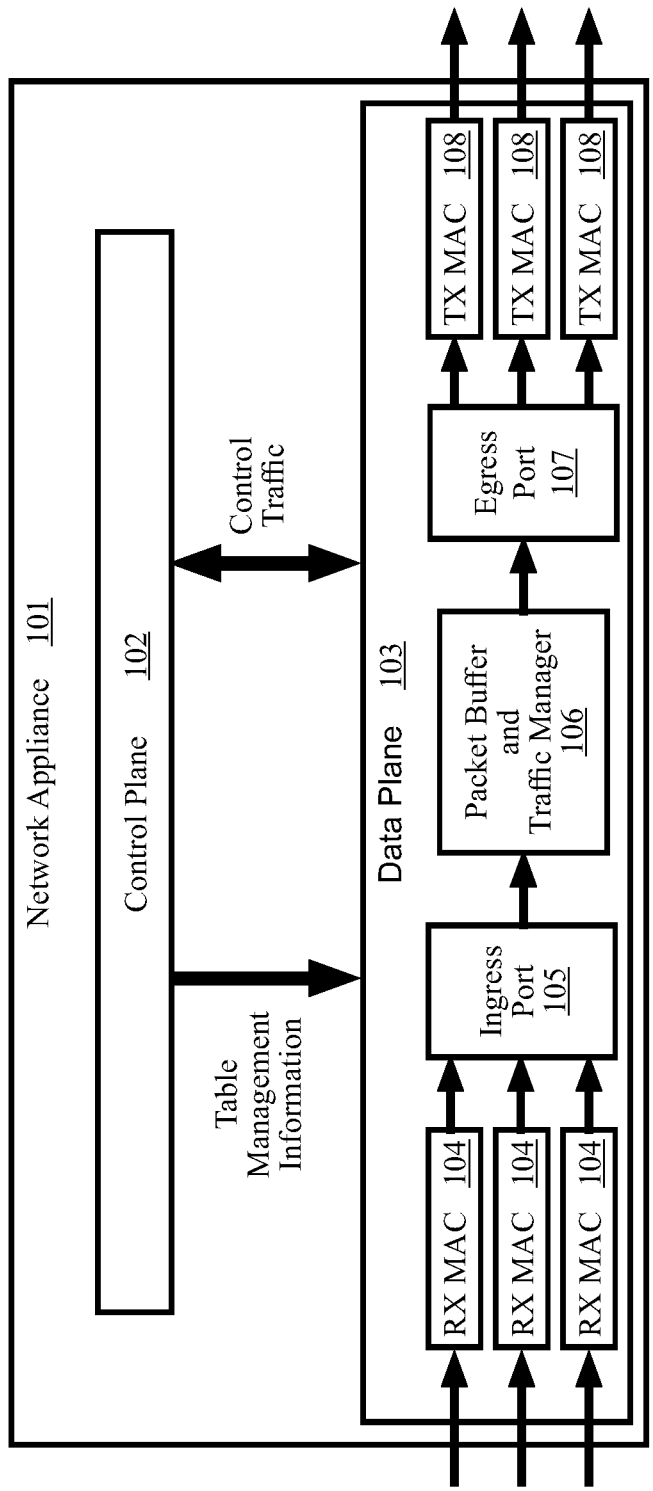
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Two important aspects of a network appliance's performance are throughput and connection processing. Throughput, relating to packet processing speed, is often measured in bps (bits/sec) or Bps (bytes/sec). Connection processing, relating to the speed with which the network appliance can be configured to process new network traffic flows, is often measured in CPS (connections/sec). CPS can be increased when processing is not repeated in different parts of the network appliance, when unnecessary processing is avoided, and when processing is performed by the fastest subsystem that can perform the processing.

Aspects described herein process packets using match-action pipelines, extended packet processing pipelines, and CPU (central processing unit) cores. The match-action pipeline is a part of a data plane that can process network traffic flows extremely quickly, but only after being configured to process those traffic flows. The match-action pipeline must be specifically configured for each traffic flow. As such, the match-action pipeline cannot process a new network traffic flow because it has not yet been configured for that flow. Packets for a new flow are often called "flow miss packets". The extended packet processing pipelines and CPU cores can handle packets that the match-action pipeline is not configured to handle, such as flow miss packets. One way to handle flow miss packets is to configure the match-action pipeline to process them, then to resubmit the packets to the match-action pipeline.

The network appliance's CPS can be increased by passing data generated by a match-action pipeline to the extended packet processing pipeline or CPU cores. The match-action pipeline determines a hash key and an entry location for every packet it receives. If there is no entry at the entry location, then the packet is a flow miss packet and the entry location can be considered an insertion point for a new entry. The extended packet processing pipeline or CPU cores can generate a configuration based on the flow miss packet. Installing the configuration in the match-action pipeline configures it to handle the flow miss packet. The configuration can contain a hash value and an insertion point. The network appliance's CPS and throughput are increased when the configuration uses the hash value and insertion point generated by the match-action pipeline instead of that data being generated a second time.

The network appliance's CPS can be increased by using burst queues. A network appliance can experience a burst of flow misses when many new traffic flows suddenly arrive or when a change to the network appliance's configuration or policies invalidates previously configured flows. Only one packet from each flow is needed to produce a configuration for that flow and to configure the match-action pipeline for that flow. Burst action queues can hold the packets for the flows such that, for example, only one flow miss packet for each flow is sent in for generating a configuration. The remaining packets for a flow can be released for processing after the match-action pipeline is configured for that flow.

FIG. 1 is a functional block diagram of a network appliance 101 having a control plane 102 and a data plane 103 and in which aspects may be implemented. As illustrated in FIG. 1, the control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Often times, the high-volume and rapid decision-making that occurs at the data plane is implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 104, an ingress port 105, a packet buffer/traffic manager 106, an egress port 107, and multiple transmit MACs (TX MAC) 108. The data plane elements described may be implemented, for example, as a P4 programmable switch architecture (PSA) or as a P4 programmable NIC, although architectures other than a PSA and a P4 programmable NIC are also possible.

The RX MAC 104 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 108 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding. The packet buffer/traffic manager 106 includes memory and/or logic to implement packet buffering and/or traffic management. In an embodiment, operations implemented via the packet buffer/traffic manager include, for example, packet buffering, packet scheduling, and/or traffic shaping.

The ingress port 105 and egress port 107 can be packet processing pipelines that operate at the data plane of a network appliance and can be programmable via a domain-specific language such as P4. In an embodiment, the ingress port 105 and egress port 107 can be programmed to implement various operations at the data plane such as, for example, routing, bridging, tunneling, forwarding, network access control lists (ACLs), Layer 4 (L4) firewalls, flow-based rate limiting, VLAN tag policies, group membership, isolation, multicast, group control, label push/pop operations, L4 load-balancing, L4 flow tables for analytics and flow specific processing, distributed denial of service (DDoS) attack detection, DDoS attack mitigation, and telemetry data gathering on any packet field or flow state.

Figure 2:
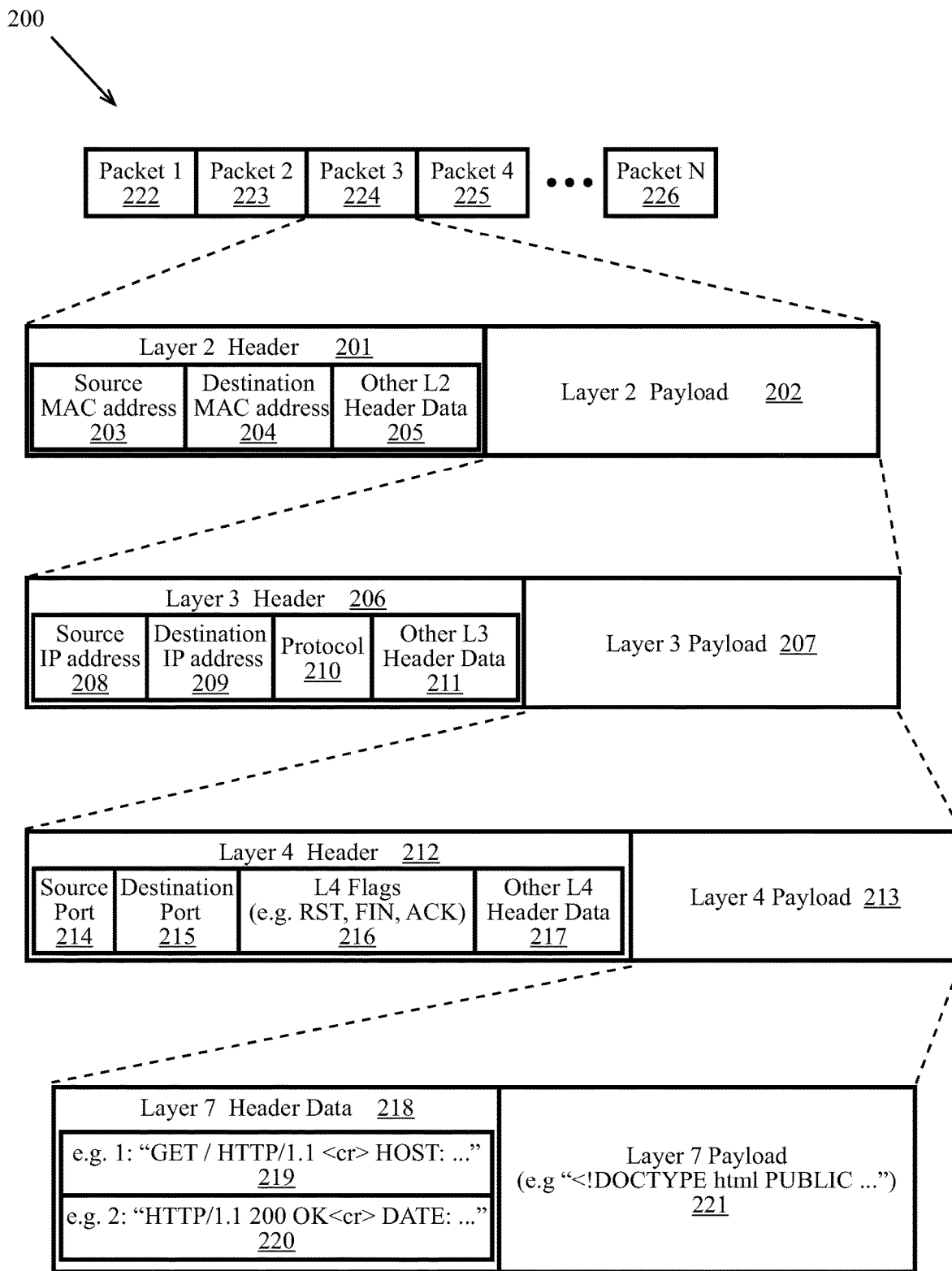
FIG. 2 illustrates packet headers and payloads of packets in a network traffic flow that can be processed according to some aspects.

FIG. 2 illustrates packet headers and payloads of packets 222, 223, 224, 225, 226 in a network traffic flow 200 that can be processed according to some aspects. A network traffic flow 200 can have numerous packets such as a first packet 222, a second packet 223, a third packet 224, a fourth packet 225, and a final packet 226 with many more packets between the fourth packet 225 and the final packet 226. The term "the packet" or "a packet" can refer to any of the packets in a network traffic flow.

In general, packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 104 as a raw bit stream or transmitted by TX MAC 108 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 201 and layer 2 payload 202. The layer 2 header can contain a source MAC address 203, a destination MAC address 204, and other layer 2 header data 205. The input ports 104 and output ports 108 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 104 and a TX MAC 108. Ethernet, also known as Institute of Electrical and Electronics Engineers (IEEE) 802.3 is a layer 2 protocol. IEEE 802.11 (WiFi) is another widely used layer 2 protocol. The layer 2 payload 202 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 206 and a layer 3 payload 207. The layer 3 header 206 can have a source IP address 208, a destination IP address 209, a protocol 210, and other layer 3 header data 211. As an example, a first node can send an IP packet to a second node via an intermediate node. The IP packet therefor has a source IP address indicating the first node and a destination IP address indicating the second node. The first node makes a routing decision that the IP packet should be sent to the intermediate node. The first node therefor sends the IP packet to the intermediate node in a first layer 2 packet. The first layer 2 packet has a source MAC address 203 indicating the first node, a destination MAC address 204 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 203 indicating the intermediate node, a destination MAC address 204 indicating the second node, and the IP packet as a payload. The layer 3 payload 207 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 206 as protocol 210. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 207 includes a TCP header and a TCP payload. UDP can provide for computer applications to send messages, in this case referred to as datagrams, to other hosts on an IP network using a connectionless model. When carrying UDP data, a layer 3 payload 207 includes a UDP header and a UDP payload. ICMP is used by network devices, including routers, to send error messages and operational information indicating success or failure when communicating with another IP address. ICMP uses a connectionless model.

A layer 4 packet can have a layer 4 header 212 and a layer 4 payload 213. The layer 4 header 212 can include a source port 214, destination port 215, layer 4 flags 216, and other layer 4 header data 217. The source port and the destination port can be integer values used by host computers to deliver packets to application programs configured to listen to and send on those ports. The layer 4 flags 216 can indicate a status of or action for a network traffic flow. For example, TCP has the RST, FIN, and ACK flags. RST indicates a TCP connection is to be immediately shutdown and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A layer 4 payload 213 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), and the Dynamic Host Configuration Protocol (DHCP). Data coded according to application layer protocols can be encapsulated into transport layer protocol units (such as TCP or UDP messages), which in turn use lower layer protocols to effect actual data transfer.

A layer 7 packet may have layer 7 header data 218 and may have a layer 7 payload 221. In practice, many applications do not distinguish between headers and payloads at layer 7. HTTP is a protocol that may be considered to have headers and payloads. The illustrated layer 7 headers are for an HTTP GET 219 and for a response to an HTTP GET 220. The illustrated payload is that of the response to the HTTP GET.

Figure 3:
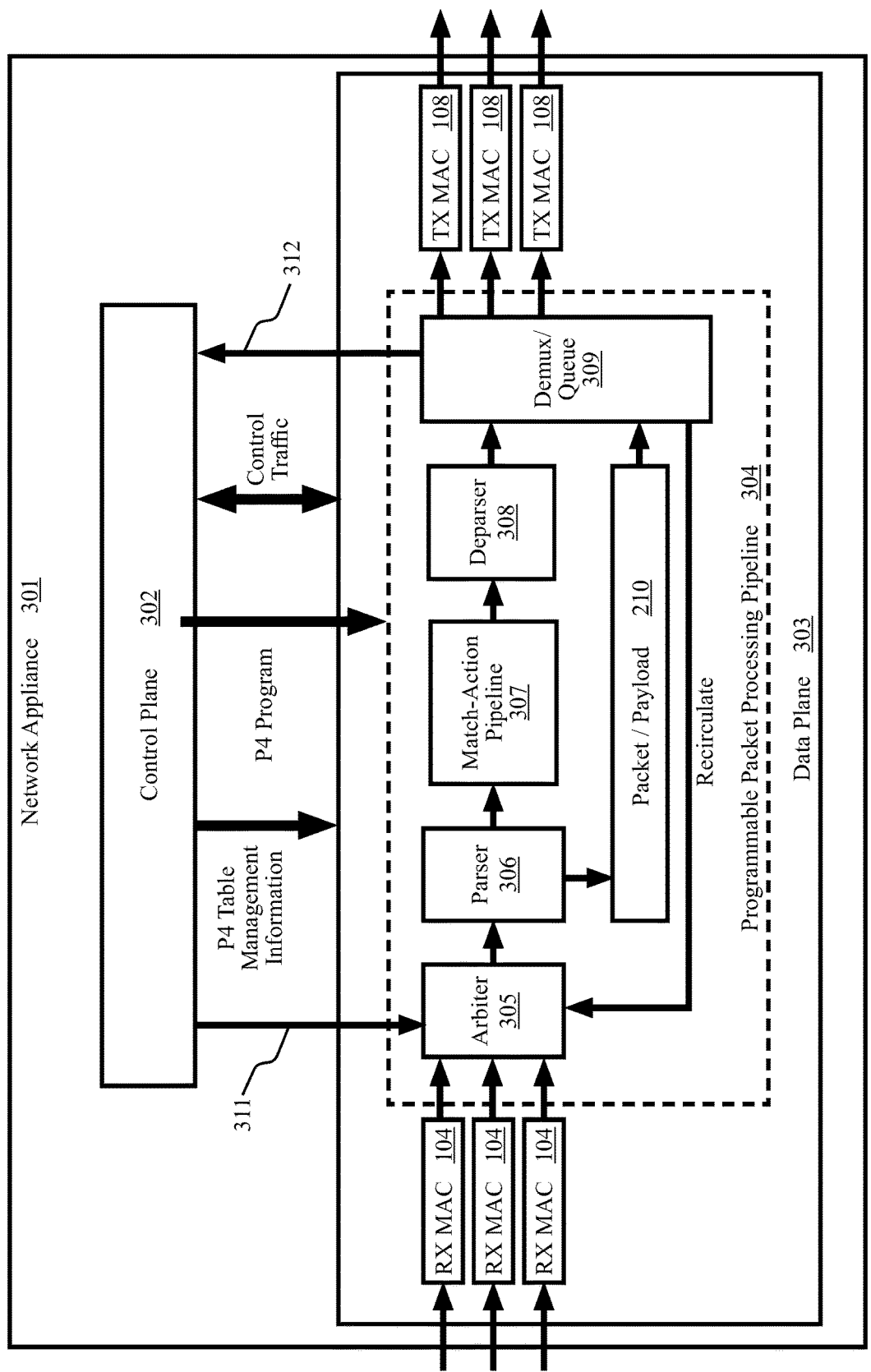
FIG. 3 is a depiction of a network appliance in which the data plane is programmable according to the P4 domain-specific language and in which aspects may be implemented.

FIG. 3 is a depiction of a network appliance 301 in which the data plane 303 is programmable according to the P4 domain-specific language and in which aspects may be implemented. As illustrated in FIG. 3, a P4 program is provided to the data plane via the control plane 302. The P4 program includes software code that configures the functionality of the data plane to implement particular processing and/or forwarding logic and processing and/or forwarding tables are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 303 includes a programmable packet processing pipeline 304 that is programmable using a domain-specific language such as P4 and that can be used to implement the programmable packet processing pipeline 304. As described in the P4 specification, a programmable packet processing pipeline can include an arbiter 305, a parser 306, a match-action pipeline 307, a deparser 308, and a demux/queue 309. The arbiter 305 can act as an ingress unit receiving packets from RX-MACs 104 and can also receive packets from the control plane via a control plane packet input 311. The arbiter 305 can also receive packets that are recirculated to it by the demux/queue 309. The demux/queue 309 can act as an egress unit and can also be configured to send packets to a drop port (the packets thereby disappear), to the arbiter via recirculation, and to the control plane 302 via an output CPU port. The control plane is often referred to as a CPU (central processing unit) although, in practice, control planes often include multiple CPU cores and other elements. The arbiter 305 and the demux/queue 309 can be configured through the domain-specific language (e.g., P4).

The parser 306 is a programmable element that is configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a KW corresponding to a packet may vary as the packet passes through the match-action pipeline.

The deparser 308 is a programmable element that is configured through the domain-specific language (e.g., P4) to generate packet headers from PHVs at the output of match-action pipeline 307 and to construct outgoing packets by reassembling the header(s) (e.g., Ethernet and IP headers) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager (e.g. FIG. 1, element 106) for scheduling and possible replication. In some cases, once a packet is scheduled and leaves the packet buffer/traffic manager, the packet may be parsed again to generate an egress PHV. The egress may be passed through a match-action pipeline after which a final deparser operation may be executed (e.g., at deparser 308) before the demux/queue 309 sends the packet to the TX MAC 108 or recirculates it back to the arbiter 305 for additional processing.

Figure 4:
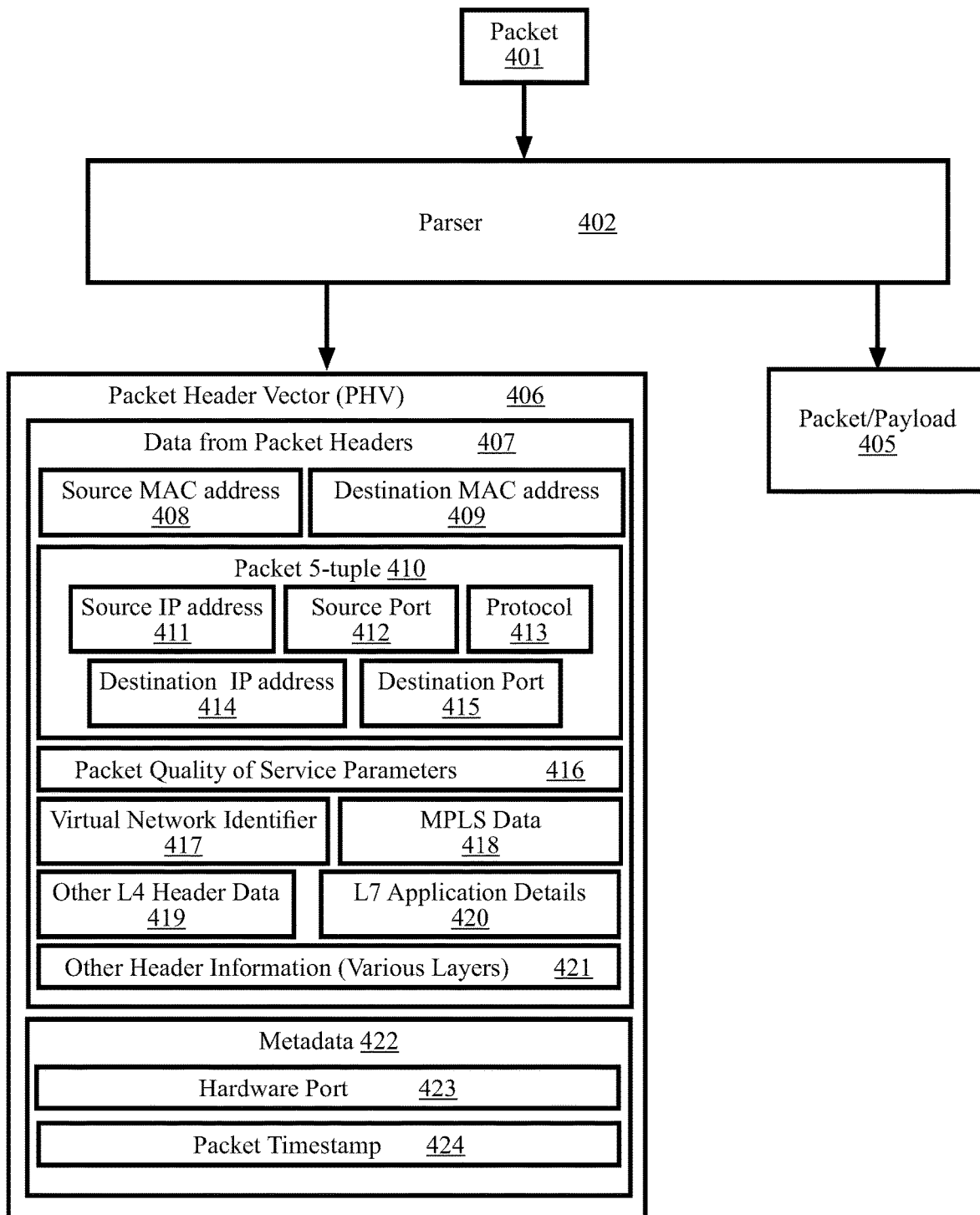
FIG. 4 is a high-level diagram illustrating an example of generating a packet header vector from a packet according to some aspects.

FIG. 4 is a high-level diagram illustrating an example of generating a packet header vector 406 from a packet 401 according to some aspects. The parser 402 can receive a packet 401 that has layer 2, layer 3, layer 4, and layer 7 headers and payloads. The parser can generate a packet header vector (PHV) from packet 401. The packet header vector can include many data fields including data from packet headers 407 and metadata 422. The metadata 422 can include data generated by the network appliance such as the hardware port 423 on which the packet 401 was received and the packet timestamp 424 indicating when the packet 401 was received by the network appliance.

The source MAC address 408 can be obtained from the layer 2 header 201. The destination MAC address 409 can be obtained from the layer 2 header 201. The source IP address 411 can be obtained from the layer 3 header 206. The source port 412 can be obtained from the layer 4 header 212. The protocol 413 can be obtained from the layer 3 header 206. The destination IP address 414 can be obtained from the layer 3 header 206. The destination port 415 can be obtained from the layer 4 header 212. The packet quality of service parameters 416 can be obtained from the layer 3 header 206 or another header based on implementation specific details. The virtual network identifier 417 may be obtained from the layer 2 header 201. The multi-protocol label switching (MPLS) data 418, such as an MPLS label, may be obtained from the layer 2 header 201. The other layer 4 data 419 can be obtained from the layer 4 header 212. The layer 7 application details 420 can be obtained from the layer 7 header 218 and layer 7 payload 221. The other header information 421 is the other information contained in the layer 2, layer 3, layer 4, and layer 7 headers.

The packet 5-tuple 410 is often used for generating keys for match tables, discussed below. The packet 5-tuple 410 can include the source IP address 411, the source port 412, the protocol 413, the destination IP address 414, and the destination port 415.

Those practiced in computer networking protocols realize that the headers carry much more information than that described here, realize that substantially all of the headers are standardized by documents detailing header contents and fields, and know how to obtain those documents. The parser can also be configured to output a packet or payload 405. Recalling that the parser 402 is a programmable element that is configured through the domain-specific language (e.g., P4) to extract information from a packet, the specific contents of the packet or payload 405 are those contents specified via the domain specific language. For example, the contents of the packet or payload 405 can be the layer 3 payload.

Figure 5:
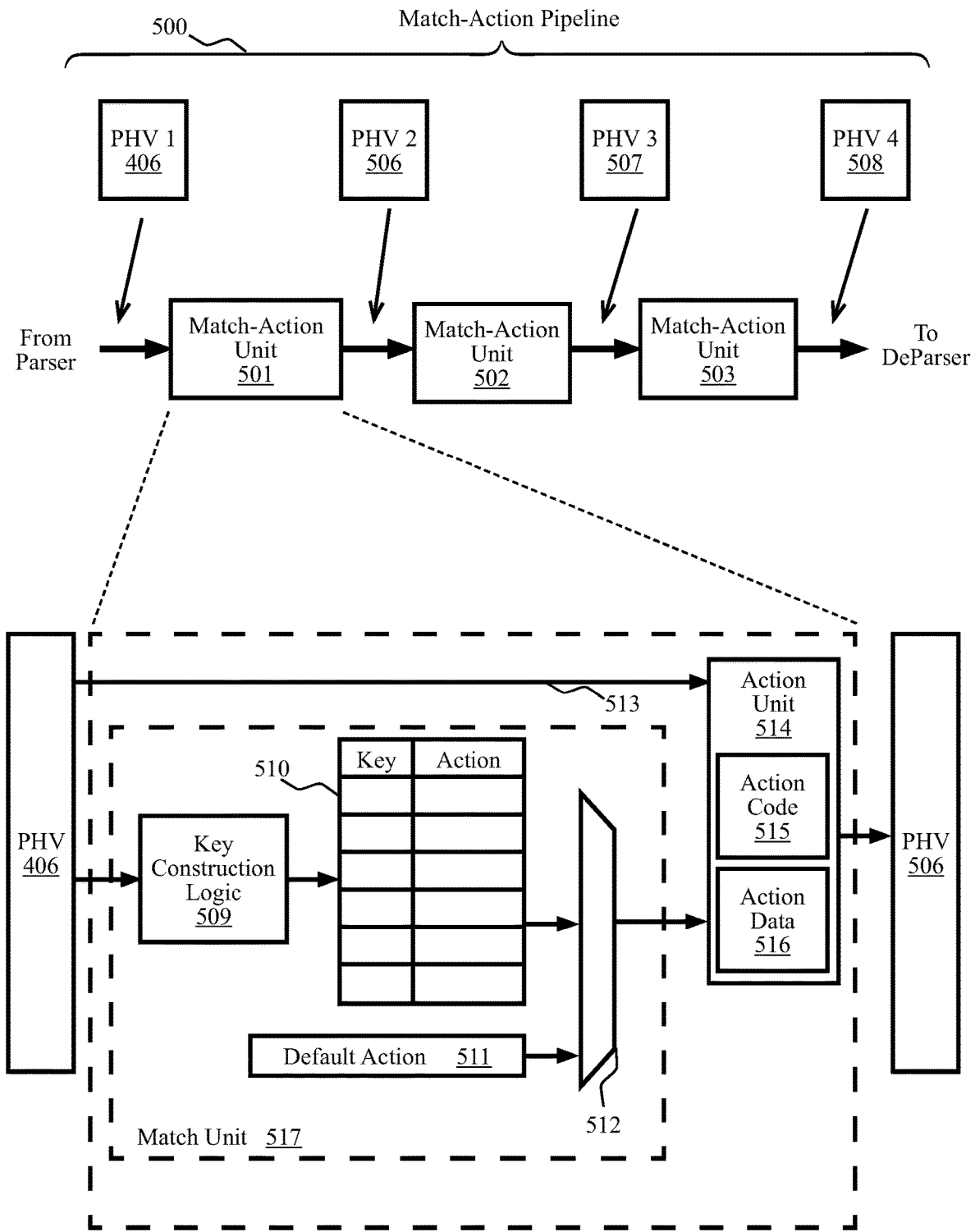
FIG. 5 is a functional block diagram illustrating an example of a match-action unit in a match-action pipeline according to some aspects.

FIG. 5 is a functional block diagram illustrating an example of a match-action unit 501 in a match-action pipeline 500 according to some aspects. FIG. 5 introduces certain concepts related to match-action units and match-action pipelines and is not intended to be limiting. The match-action units 501, 502, 503 of the match-action pipeline 500 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 501 receives PHV 1 406 as an input and outputs PHV 2 506. Match-action unit 2 502 receives PHV 2 506 as an input and outputs PHV 3 507. Match-action unit 3 503 receives PHV 3 507 as an input and outputs PHV 4 508.

An expanded view of elements of a match-action unit 501 of match-action pipeline 500 is shown. The match-action unit includes a match unit 517 (also referred to as a "table engine") that operates on an input PHV 406 and an action unit 514 that produces an output PHV 506, which may be a modified version of the input PHV 406. The match unit 517 can include key construction logic 509, a lookup table 510, and selector logic 512. The key construction logic 509 is configured to generate a key from at least one field in the PHV. The lookup table 510 is populated with key-action pairs, where a key-action pair includes a key (e.g., a lookup key) and corresponding action code 515 and/or action data 516. In an embodiment, a P4 lookup table generalizes traditional switch tables, and can be programmed to implement, for example, routing tables, flow lookup tables, ACLs, and other user-defined table types, including complex multi-variable tables. The key generation and lookup function constitutes the "match" portion of the operation and produces an action that is provided to the action unit via the selector logic. The action unit executes an action over the input data (which may include data 513 from the PHV) and provides an output that forms at least a portion of the output PHV. For example, the action unit executes action code 515 on action data 516 and data 513 to produce an output that is included in the output PHV. If no match is found in the lookup table, then a default action 511 may be implemented. A flow miss is example of a default action that may be executed when no match is found. In an embodiment, operations of the match-action unit are programmable in the control plane via P4 and the contents of the lookup table is managed by the control plane.

Figure 6:
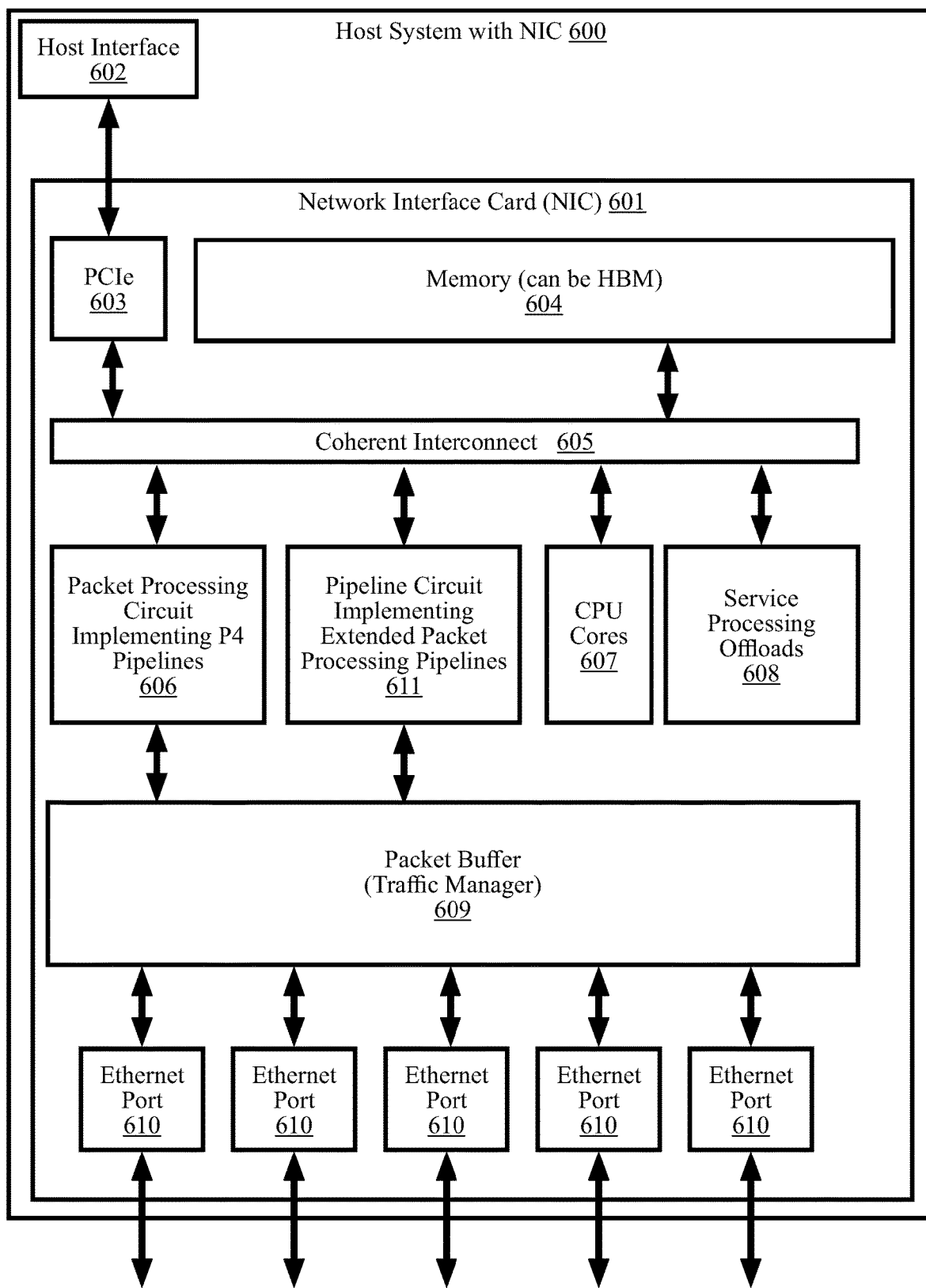
FIG. 6 is a high-level diagram of a network interface card configured as a network appliance according to some aspects.

FIG. 6 is a high-level diagram of a network interface card (NIC) 601 configured as a network appliance according to some aspects. Aspects of the embodiments, including packet processing pipelines, fast data paths, and slow data paths, can be implemented in the NIC 601. The NIC 601 can be configured for operation within a host system 600. The host system can be a general-purpose computer with a host interface 602 such as a PCIe interface. The NIC 601 can have a PCIe interface 603 through which it can communicate with the host system 600. The NIC can also include a memory 604, a coherent interconnect 605, a packet processing circuit implementing P4 pipelines 606, a pipeline circuit 611 implementing extended packet processing pipelines (also called P4+ pipelines), CPU cores 607, service processing offloads 608, packet buffer 609, and ethernet ports 610.

As discussed above, the P4 pipelines are configured for programming via a P4 domain-specific language for programming the data plane of network appliances that is currently defined in the "P4$_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The P4+ pipeline may be similar to a P4 pipeline bit is not constrained as the P4 pipeline is.

The NIC 601 can include a memory 604 for running Linux or some other operating system, for storing large data structures such as flow tables and other analytics, and for providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 607 are general purpose processor cores, such as ARM processor cores, Microprocessor without Interlocked Pipeline Stages (MIPS) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 607 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are four CPU cores 607 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 608 are specialized hardware modules purposely optimized to handle specific tasks at wire speed, such as cryptographic functions, compression/decompression, etc.

The packet buffer 609 can act as a central on-chip packet switch that delivers packets from the network interfaces 610 to packet processing elements of the data plane and vice-versa. The packet processing elements can include a slow data path implemented in software and a fast data path implemented by packet processing circuitry 606. The pipeline circuit 611 may operate as a part of the fast data path, may offload processing from the CPUs, and may perform other functions.

The packet processing circuit implementing P4 pipelines 606 can be a specialized circuit or part of a specialized circuit using one or more ASICs or FPGAs to implement a programmable packet processing pipeline such as the programmable packet processing pipeline 304 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 607 and memory 604 are configured via software to implement a slow data path. A network appliance having two data paths has a fast data path and a slow data path when one of the data paths process packets faster than the other data path.

The pipeline circuit 611 can be a specialized circuit or part of a specialized circuit using one or more ASICs or FPGAs to implement an extended packet processing pipeline. Some embodiments include ASICs or FPGAs implementing a P4+ pipeline supplementing P4 pipeline in a fast data path within the network appliance.

All memory transactions in the NIC 601, including host memory, on board memory, and registers may be connected via a coherent interconnect 605. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing P4 pipelines 606, pipeline circuit implementing extended packet processing pipelines 611, CPU cores 607, and PCIe 603. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

Figure 7:
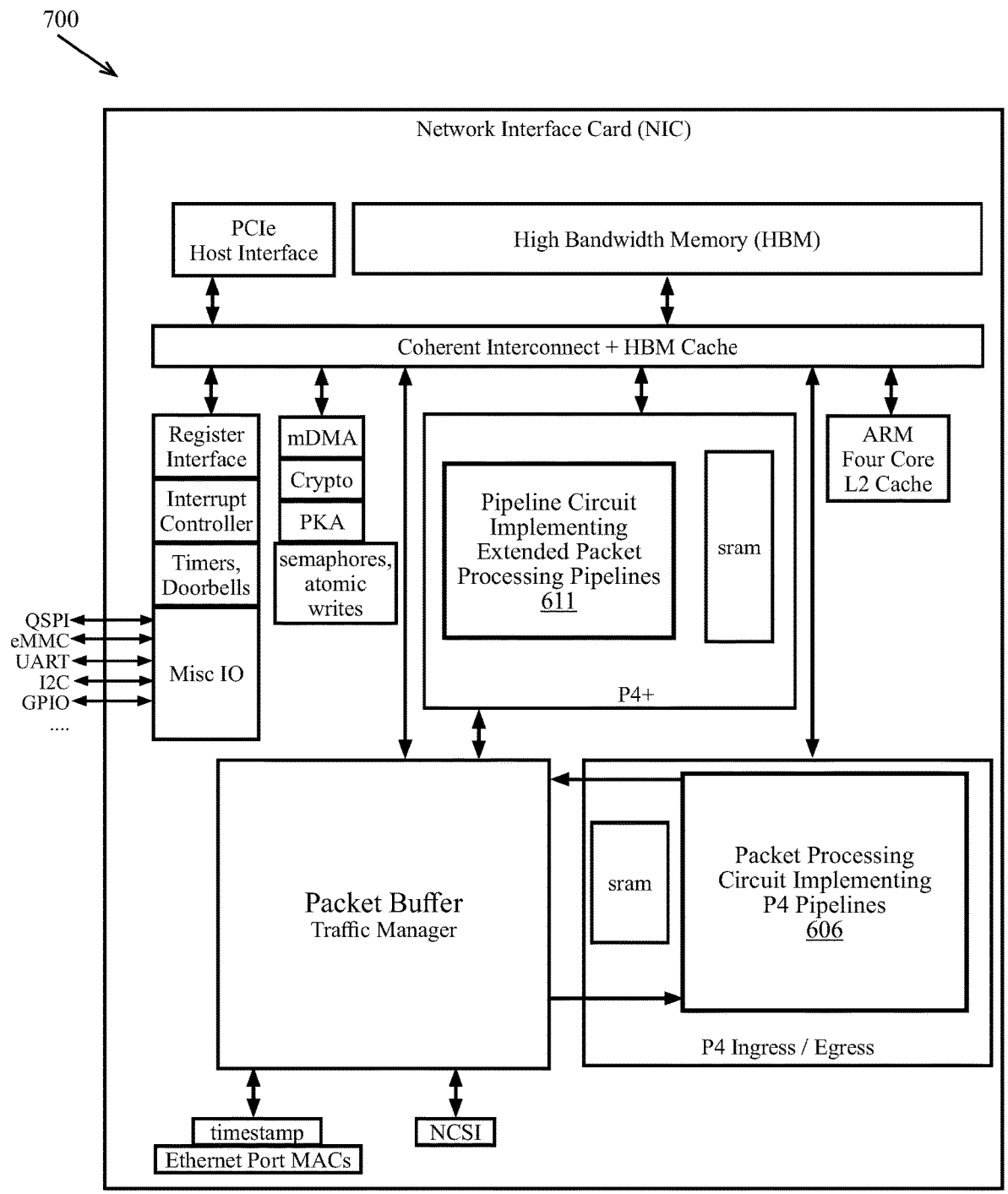
FIG. 7 illustrates a block diagram of an exemplary system in which aspects may be implemented.

FIG. 7 illustrates a block diagram of an exemplary NIC 700 in which aspects may be implemented. The NIC 700 serves as an example of implementing the P4 and P4+ pipelines and various other functions to provide improved network performance. The NIC 700 can include four advanced RISC machine (ARM) processors with coherent LI and L2 caches, a shared local memory system, flash non-volatile memory, DMA engines, and miscellaneous 10 devices for operation and debug.

The NIC can have a host interface and a network interface. The host interface can be configured to provide communication link(s) with a host system. The host interface can expose NIC functions to the host system. The network interface can support network connections or uplinks with a computing network that may be, for example, a local area network, a wide area network, or other network.

Memory transactions in the NIC 700, including host memory, high bandwidth memory (HBM), and registers may be connected via a coherent network on a chip (NOC) based on a prequalified IP core from a third party. The NOC may provide cache coherent interconnect between the NOC masters, including P4 pipeline, extended packet processing pipeline, DMA, PCIe, and ARM. The interconnect may distribute HBM memory transactions across a plurality (e.g., 16) of HBM interfaces using a programmable hash algorithm. All traffic targeting HBM may be stored in the NOC cache (e.g., 1 MB cache). The NOC cache may be kept coherent with the ARM caches. The NOC cache may be used to aggregate HBM write transactions which may be smaller than the cache line (e.g., size of 64 bytes), as the HBM is not efficient when processing small writes. The NOC cache may have high bandwidth (e.g. to 3.2 Tb/s operation) as it fronts the HBM which has high bandwidth (e.g. 1.6 Tb/s HBM).

The NIC 700 can have an internal HBM memory system for running Linux, storing large data structures such as flow tables and other analytics, and providing buffering resources for advanced features including TCP termination and proxy, deep packet inspection, storage offloads, and connected FPGA functions. The memory system can have an HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4×8 or single PCIe Gen3×16).

Figure 8:
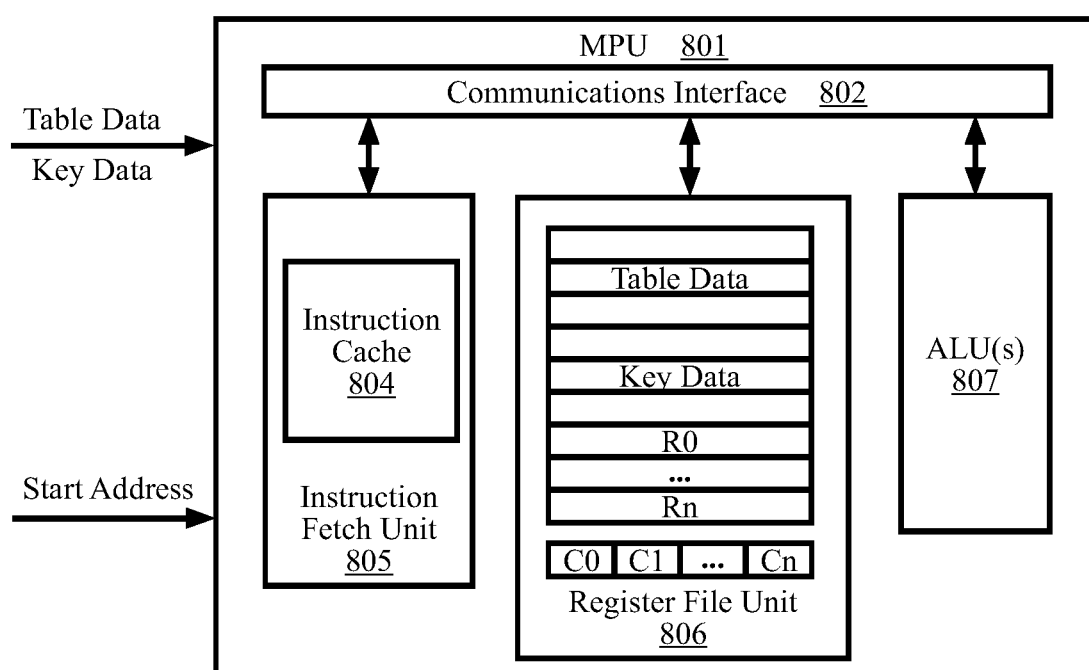
FIG. 8 illustrates a block diagram of a match processing unit (MPU) that may be used within the exemplary system of FIG. 7 to implement some aspects.

FIG. 8 illustrates a block diagram of a match processing unit (MPU) 801 that may be used within the exemplary system of FIG. 7 to implement some aspects. The MPU 801 can have multiple functional units, memories, and a register file. For example, the MPU 801 may have an instruction fetch unit 805, a register file unit 806, a communication interface 802, arithmetic logic units (ALUs) 807 and various other functional units.

In the illustrated example, the MPU 801 can have a write port or communication interface 802 allowing for memory read/write operations. For instance, the communication interface 802 may support packets written to or read from an external memory (e.g., high bandwidth memory (HBM) of a host device) or an internal static random-access memory (SRAM). The communication interface 802 may employ any suitable protocol such as Advanced Microcontroller Bus Architecture (AMBA) Advanced extensible Interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 802 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

The MPU 801 can have an instruction fetch unit 805 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 805 can have an instruction cache 804 for storing one or more programs. In some cases, the one or more programs may be loaded into the instruction cache 804 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 802. This provides flexibility to allow for executing different programs associated with different types of data using the same processing unit. In an example, a management packet header vector (PHV) can be injected into the pipeline, for example to perform administrative table direct memory access (DMA) operations or entry aging functions (i.e., adding timestamps), one of the management MPU programs may be loaded to the instruction cache to execute the management function. The instruction cache 804 can be implemented using various types of memories such as one or more SRAMs.

The one or more programs can be any programs such as P4 programs related to reading table data, building headers, DMA to/from memory regions in HBM or in the host device and various other actions. The one or more programs can be executed in any stage of a pipeline as described elsewhere herein.

The MPU 801 can have a register file unit 806 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 806 may comprise a plurality of general-purpose registers (e.g., R0, R1, . . . Rn) which may be initially loaded with metadata values then later used to store temporary variables within execution of a program until completion of the program. For example, the register file unit 806 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 806 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g. 8 one-bit comparator flags). In practice, an MPU can have any number of comparator flag units each of which may have any suitable length.

The MPU 801 can have one or more functional units such as the ALU(s) 807. An ALU may support arithmetic and logical operations on the values stored in the register file unit 806. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g. table flush), or perform operations that are not related to PHV update. For example, an ALU may be configured to perform calculations on descriptor rings, scatter gather lists (SGLs), and control data structures loaded into the general purpose registers from the host memory.

The MPU 801 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some case, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 9:
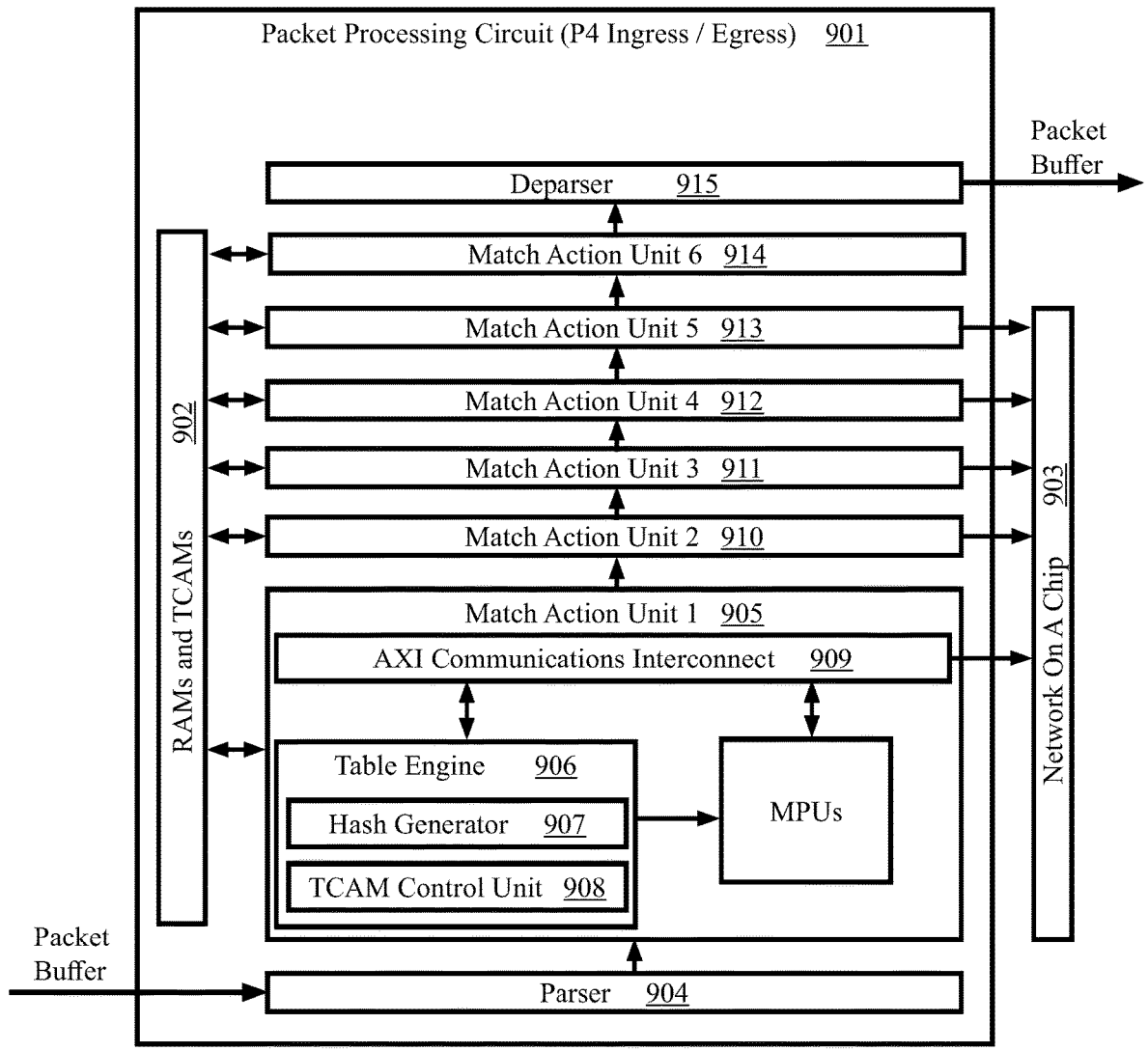
FIG. 9 illustrates a block diagram of a packet processing circuit that may be used as a P4 ingress/egress pipeline within the exemplary system of FIG. 7.

FIG. 9 illustrates a block diagram of a packet processing circuit 901 that may be configured as a P4 ingress/egress pipeline within the exemplary system of FIG. 7. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 904) according to the packet header stack specified by a P4 program. This parsed representation of the packet may be referred to as a packet header vector (PHV). The PHV may then be passed through stages (e.g., stages 905, 910, 911, 912, 913, 914) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 915. The deparser 915 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress parsed header vector. The egress parsed header vector may be passed through a P4 egress pipeline in a similar fashion as a packet passing through a P4 ingress pipeline, after which a final deparser operation may be executed before the packet is sent to its destination interface or recirculated for additional processing. The NIC 700 of FIG. 7 has a P4 ingress pipeline and a P4 egress pipeline. The P4 ingress pipeline and the P4 egress pipeline can be implemented via a packet processing circuit 901.

In some embodiments, the P4 ingress pipeline and the P4 egress pipeline may be implemented using the same physical block or processing unit pipeline.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV.

The PHV produced by the parser may have any size or length. For example, the PHV can be a least 512 bits, 256 bits, 128 bits, 64 bits, 32 bits, 8 bits or 4 bits. A long PHV (e.g., a 6 Kb PHV containing all relevant header fields and metadata) can be time division multiplexed (TDM) across several cycles. The TDM capability provides support for variable length PHVs, including very long PHVs to enable complex features. A PHV length may vary as the packet passes through the pipeline stages.

The pipeline MPUs of the match-action units 905, 910, 911, 912, 913, 914 can be same as the MPU 801 of FIG. 8. Match-action units can have any number of MPUs. The match-action units of a match-action pipeline can all be identical.

A table engine 906 may be configured to support per-stage table match. For example, the table engine 906 may be configured to hash, lookup, and/or compare keys to table entries. The table engine 906 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 906 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

In some embodiments, the table engine 906 can have a hash generation unit 907. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset can be added to create a memory index. The memory index may be sent to the DRAM or SRAM array and to perform the read.

The table engine 906 can have a TCAM control unit 908. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 906 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 9. In practice, a match-action pipeline can have any number of match-action units. The match-action units can share a common set of SRAMs and TCAMs 902. The SRAMs and TCAMs 902 may be components of the pipeline. This arrangement may allow the six match-action units to divide match table resources in any suitable proportion which provides convenience to the compiler and eases the complier's task of resource mapping. Any suitable number of SRAM resources and any suitable number of TCAM resources may be used by each pipeline. For example, the illustrated pipeline can be coupled to ten SRAM resources and four or eight TCAM resources. In some instances, TCAMs may be fused vertically or horizontally for a wider or deeper search.

Figure 10:
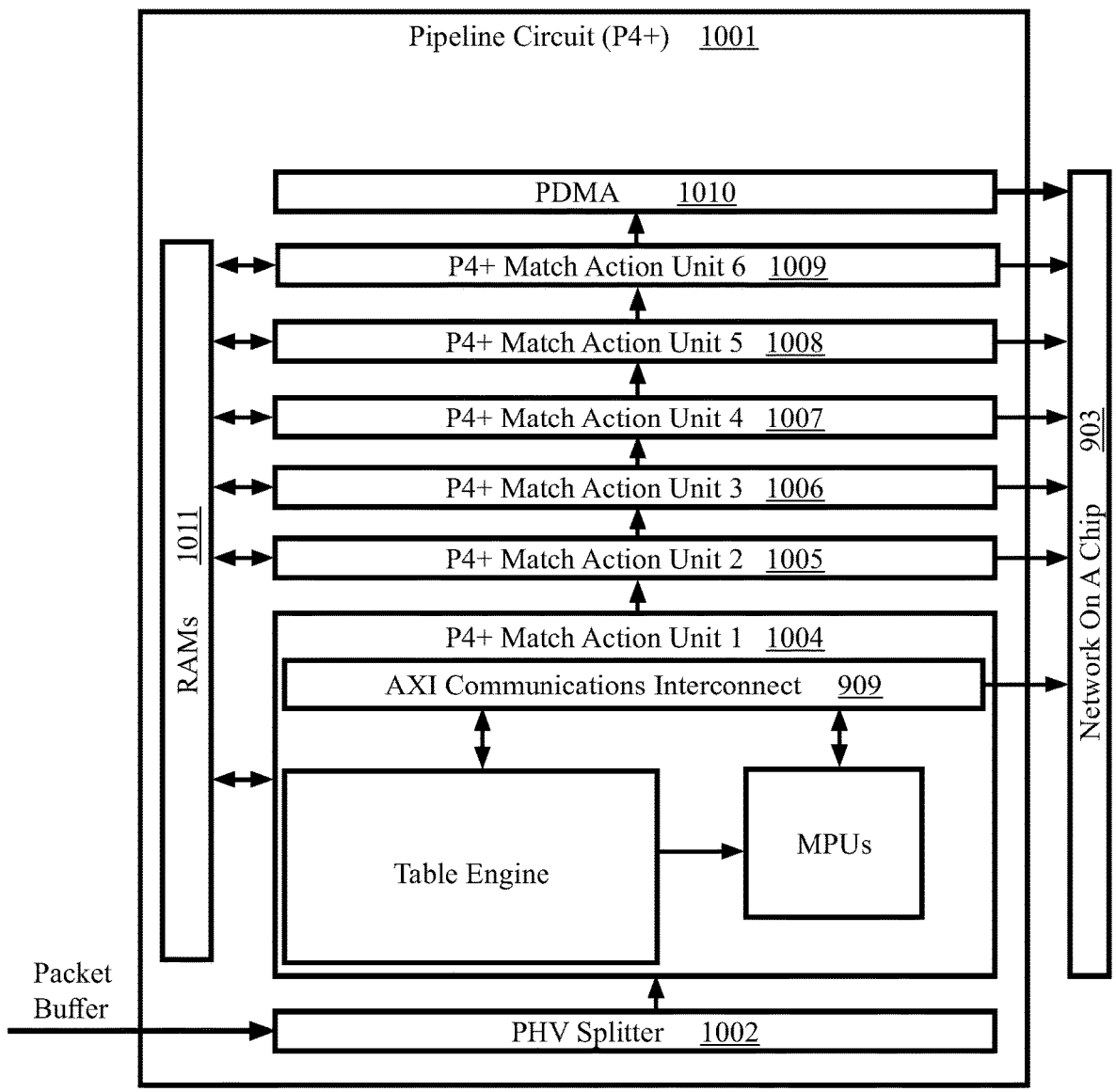
FIG. 10 illustrates a block diagram of a pipeline circuit that may be used as an extended packet processing pipeline, or P4+ pipeline, within the exemplary system of FIG. 7.

FIG. 10 illustrates a block diagram of a pipeline circuit that may be used as an extended packet processing pipeline, or P4+ pipeline, within the exemplary system of FIG. 7. Extended packet processing pipelines are sometimes called a P4+ pipelines. The extended packet processing pipeline stages are illustrated as extended P4 pipeline stages having P4+ match-action units, 1004, 1005, 1006, 1007, 1008, 1009. The extended packet processing pipeline stages can be substantially similar to the P4 pipeline stages of FIG. 9 with a few different features. In some cases, the extended packet processing pipeline stages may not use TCAM resources and may use less SRAM resources than P4 stages. The extended packet processing pipeline can have a different number of stages than the P4 pipeline. The extended packet processing pipeline is illustrated with a payload DMA (PDMA) stage 1010 at the end of the pipeline. In some cases, the extended packet processing pipeline may have a local PHV recirculate data path that may recirculate a PHV without using the packet buffer. A packet may be passed to the extended packet processing pipeline from a P4 pipeline which may include P4 forwarding, isolation, multicast, L4 security, and other network features.

In some embodiments, the extended packet processing pipeline 1001 can have a PHV splitter 1002 configured to generate an augmented PHV. For example, the metadata fields of the PHV (e.g., logical interfaces (LIF) ID) can be passed from the P4 pipeline through the packet buffer as a contiguous block of fields prepended to the packet. Before entering the first stage of extended packet processing pipeline, the PHV splitter 1002 may extract the prepended metadata and place it in the augmented PHV. The PHV splitter 1002 can maintain a count of number of PHVs that are currently in the extended packet processing pipeline, as well as a count of number of packet payload bytes that are in the pipeline. In some cases, when either the PHV count or the total packet byte count exceeds a high-water mark, the PHV splitter 1002 may stop accepting new packets from the packet buffer to ensure that packets recirculated from the PDMA 1010 have priority to be processed and exit the pipeline.

The extended packet processing pipeline can have a PDMA 1010 configured to control ordering between dependent events. A packet data may be sent in a FIFO to the PDMA 1010 505 to await DMA commands created in the extended packet processing pipeline. The DMA commands may be created by the MPU. The PDMA 1010 at the end of the extended packet processing pipeline can execute the PDMA write commands, DMA completion queue (CQ) write commands, interrupt assertion writes, DMA operations, and other commends in the order the DMA commands are placed in the PHV. DMA commands can be placed in a PHV. In some cases, the DMA commands generated in the extended packet processing pipeline are arranged in a contiguous space such that the commands can be executed in order as long as the first command and the last command are indicated. For instance, the first DMA command may be pointed to by an intrinsic PHV field and subsequent DMA commands may be placed contiguous within the PHV, where the last DMA command may be indicated by the another intrinsic PHV field. In some cases, the order may not be maintained between some of the DMA commands. For example, the order between memory to memory command and non-memory to memory commands may not be maintained. This is beneficial to prevent memory to memory read latency from blocking packet processing commands. The extended packet processing pipeline can generate traffic flow management data such as augmented PHVs, configurations for the match-action pipeline, and other data. The flow management data can be written to a memory, such as the HMB, using a direct memory access operation.

Figure 11A:
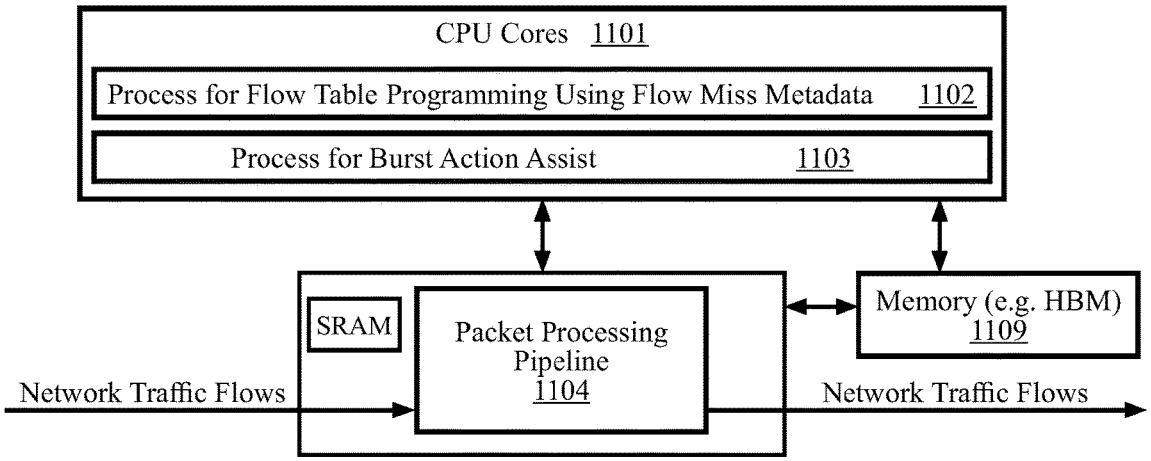
FIGS. 11A-11B illustrate offloading tasks from the CPU cores to an extended packet processing pipeline according to some aspects.
Figure 11B:
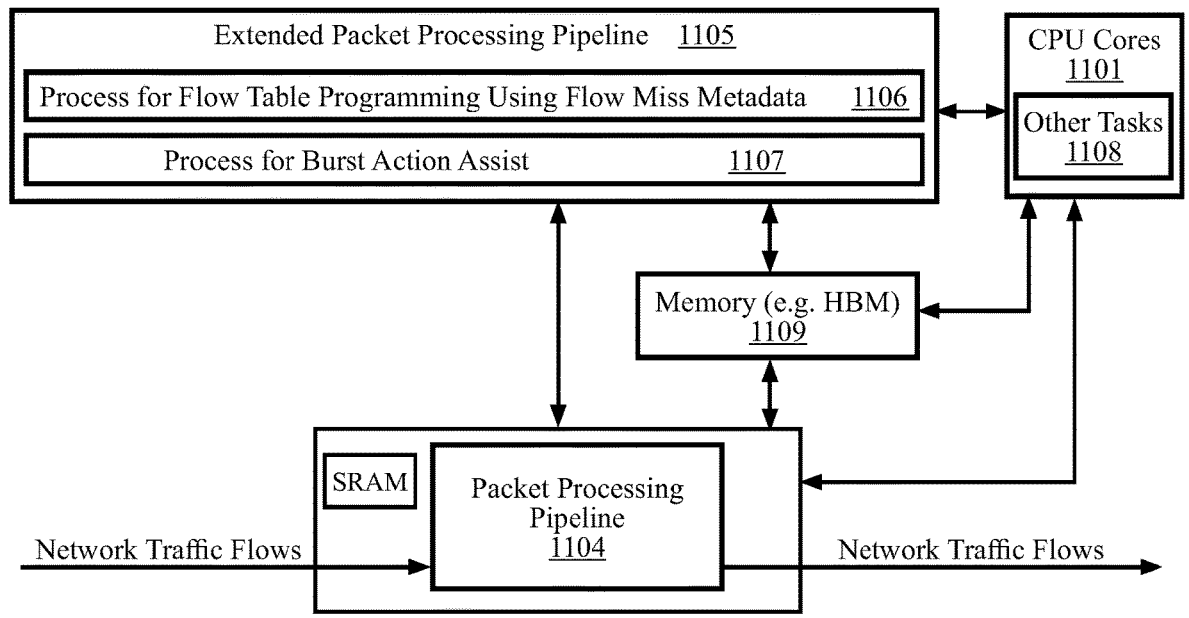

FIGS. 11A-11B illustrate offloading tasks from the CPU cores to an extended packet processing pipeline according to some aspects. In FIG. 11A, the CPU cores 1101 are configured to run processes including a process for flow table programming using flow miss metadata 1102, and a process for burst action assist 1103. The processes 1102, 1103 can interact with the memory 1109 and with the packet processing pipeline 1104 which is illustrated as containing an SRAM. The illustrated processes are detailed below. In FIG. 11B, the illustrated processes have been offloaded to the extended packet processing pipeline 1105. The extended packet processing pipeline 1105 is configured to run processes including a process for flow table programming using flow miss metadata 1106, and a process for burst action assist 1107. The processes 1106, 1107 can interact with the memory 1109, the CPU cores 1101, and with the packet processing pipeline 1104 which is illustrated as containing an SRAM.

Figure 12:
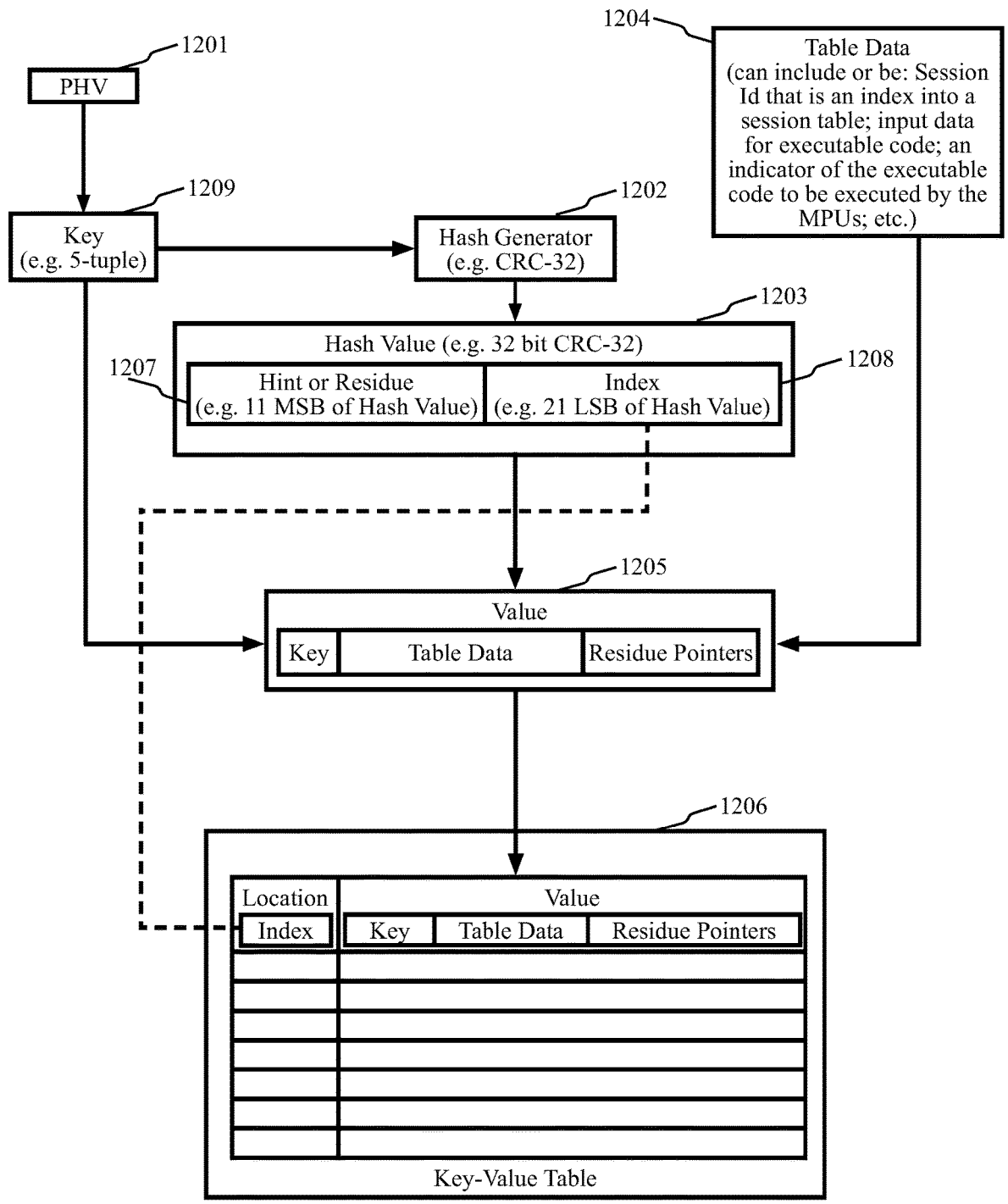
FIG. 12 illustrates populating a key-value table according to some aspects.

FIG. 12 illustrates populating a key-value table according to some aspects. In the non-limiting example of FIG. 12, a key 1209 is read from the PHV 1201 of a packet. The key can be, for example, the 5-tuple of the packet or can be assembled from other data in the PHV 1201. A hash generator 1202 receives the key 1209 and generates a hash value to be used as a key 1203. The hash value can be a CRC-32 computed using the key or can be computed using a different hashing algorithm or different PHV fields. Note that CRC-32 can be used as a hashing algorithm for the purpose of generating keys in the context of a P4 pipeline. The hash value 1203 can be divided into an index 1208 and a hint or residue 1207. For example, the index 1208 can be the 21 least significant bits of the key 1203 while the residue 1207 can be the remaining 11 bits. The index can provide the location of a value 1205 in a key-value table 1206. The number of bits chosen for index determines the size of the table. Note that the term "key-value table" (or "key-value database"), is here used as a term of art and does not indicate that key 1209 is the index 1208 for the table 1206. The value 1205 can contain the key 1209, table data 1204, and residue pairs. The key-value table can contain millions of values such as value 1205. Each of the values can be stored at a location indicated by an index. As discussed below, hash collisions can occur because multiple keys can have the same index. Index locations in the table can therefore be referred to as hash buckets because multiple values having different keys but the same index can be accessed via the index location in the key-value table.

Table data 1204 can be stored in the table 1206 in association with the key. The table data 1204 can be, for example, data that is input to a function (e.g. one or more arguments of a function), or can indicate a set of instructions that can be executed by the MPUs (e.g. a pointer to function). In some embodiments, the table data is a session Id that is passed as an input to executable code such as a function (set of instructions) that is run when a table lookup produces a value having the same key as the key 1209 from the PHV 1201. The table data can be or can include any one or more of: a session Id that is an index into a session table; input data for executable code; an indicator of the executable code to be executed by the MPUs; or other data. A session table can be a key-value table with the session Id being an index into the table (the key). A session table value, located in the session table via the session Id, can be or indicate executable code and data to be used to process a packet. As such, the session Id can indicate, via a session table, the executable code and data to be used to process a packet.

If a pipeline is configured for a network traffic flow, the key-value table has an entry for that flow. A table lookup uses the index 1208 calculated from the key 1209 and can return the value 1205 at the indexed location in the key-value table 1206. A collision occurs when the index calculated for two different flows are the same.

Figure 13:
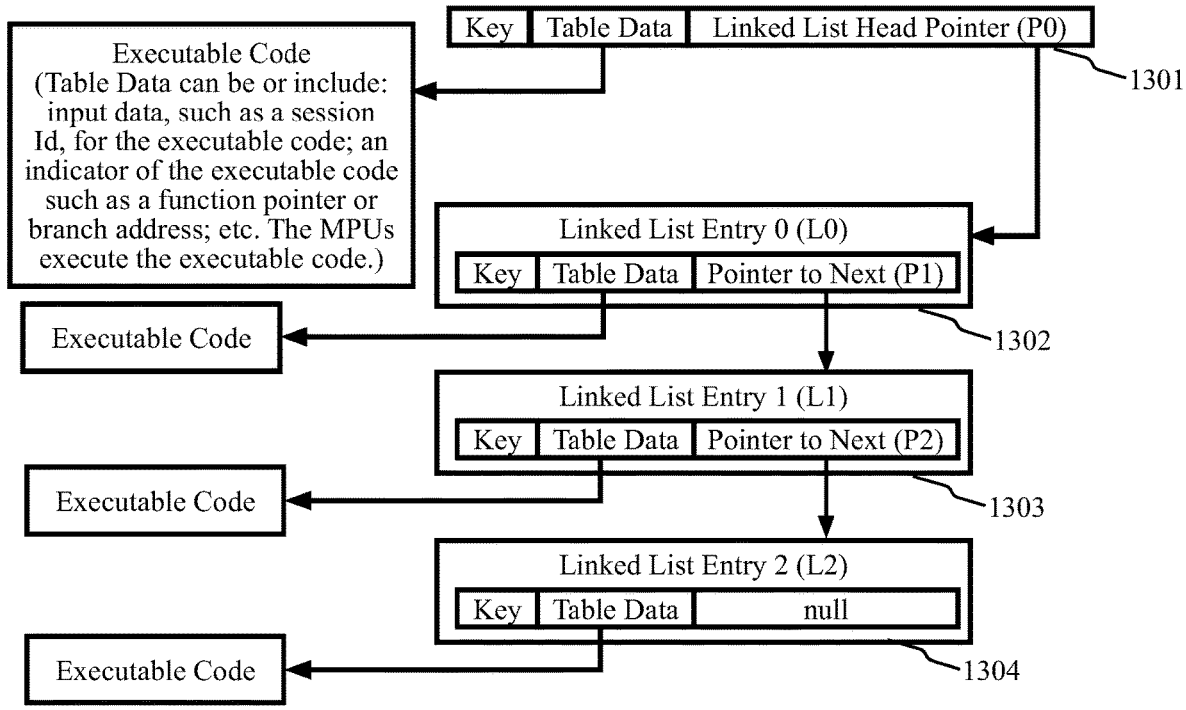
FIG. 13 illustrates collision handling via a linked list according to some aspects.

FIG. 13 illustrates collision handling via a linked list according to some aspects. A value 1301 can be returned from a key-value table using an index calculated from a packet's key, which is the key 1209 parsed and extracted from the packet. The packet's key can be compared to the key in the value 1301. If the keys are the same, the table data in the value 1301 can be used by the MPUs. If the keys are not the same, the table engine can follow the linked list head pointer P0 to the first linked list entry (L0) 1302. If the packet's key is the same as the key in L0, the table data in L0 can be provided to the MPUs, otherwise the table engine can follow the pointer (P1) to the second linked list entry (L1). If the packet's key is the same as the key in L1, the table data in L1 can be provided to the MPUs, otherwise the table engine can follow the pointer (P2) to the third linked list entry (L2).

If the packet's key is the same as the key in L2, the table data in L2 can be provided to the MPUs, otherwise the table engine determines that a flow miss has occurred because L2 is the final entry in the linked list. As discussed above, the table data can be provided to executable code as input data. For example, the table data can be a session Id that is provided as input to the executable code. The table data can also be or include an indicator of the executable code to be run, in which case the table can include a function pointer, subroutine identifier, a branch address, or some other indicator of executable code. The match-action unit can report the flow miss. The pipeline may be configured to process the traffic flow of the PHV generating the flow miss by, in part, adding a fourth linked list entry based on the traffic flow. The insertion point for the fourth linked list entry can be the third linked list entry, the new entry to be added, as L3, after L2. Those familiar with computer programming and data structures are familiar with linked lists.

A possible race condition can occur when a first new flow and a second new flow have the same index, the match-action pipeline is not yet configured to process the first new flow, and the match-action pipeline is not yet configured to process the second new flow. In such a case, the match-action pipeline provides the same insertion point for both traffic flows. The race condition occurs if the same insertion point is used when configuring the match-action pipeline to process the first new flow and the second new flow. Flow entry state data can be used to avoid the race condition. The flow entry state data can indicate which insertion points are valid, which are invalid, or both. Before configuring the match-action pipeline for the first new traffic flow, the flow entry status data can be checked to find that the insertion point is a valid insertion point. The match-action pipeline can therefore be configured to process the first new flow and the flow entry status data can be updated because the insertion point is now invalid. Afterwards, and before configuring the match-action pipeline for the second new traffic flow, the flow entry status data can be checked to find that the insertion point is invalid. A valid insertion point for the second new flow can then be determined. For example, the CPU can access the flow table to determine a valid insertion point or can recirculate a packet of the second new flow, thereby causing a flow miss resulting in a new augmented PHV for the second new flow. The flow entry state data can be a table held in memory. For example, the table can indicate a valid insertion point for each index value.

Figure 14:
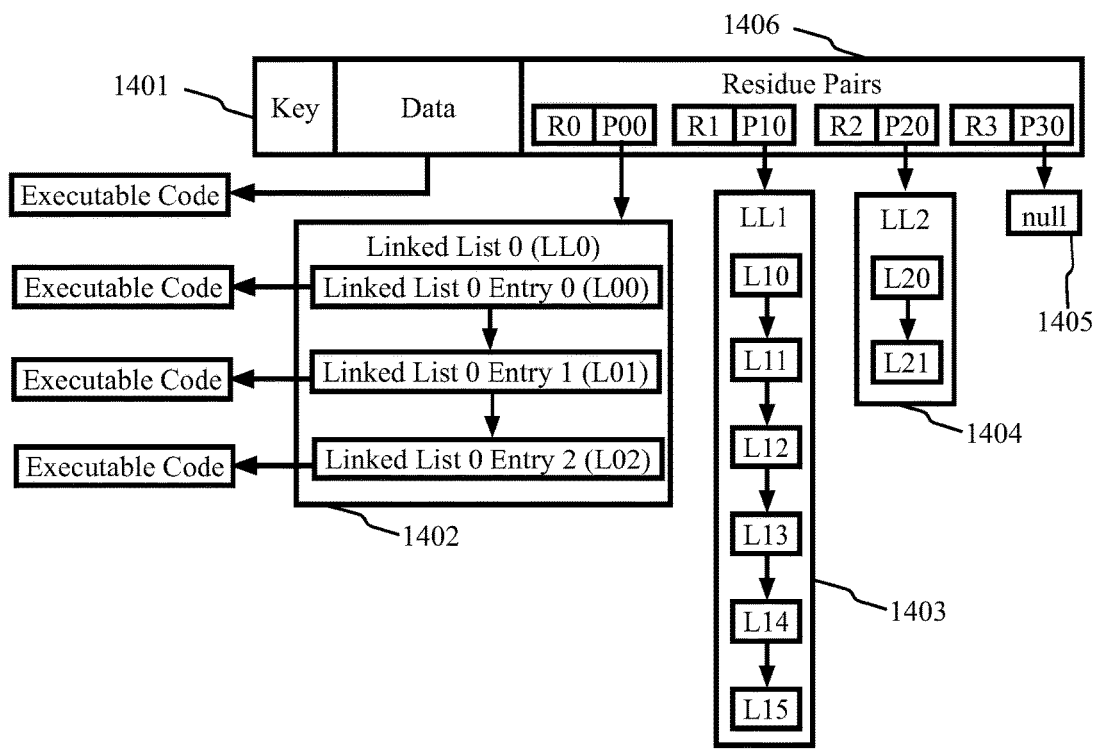
FIG. 14 illustrates collision handling via multiple linked lists according to some aspects.

FIG. 14 illustrates collision handling via multiple linked lists according to some aspects. Placing all the collisions for an index in the same linked list can result in a large data structure that is slow to traverse. Instead of one large linked list, multiple smaller linked lists can be used to more quickly find the table data or flow miss for a key. All or some of the bits of the residue can be used to indicate one of a number of linked lists. For example, two of the residue bits can be used to indicate one of four linked lists. The value 1401 returned from the key-value table can contain reside pairs 1406. The residue pairs each indicate a linked list. In the non-limiting example of FIG. 14, two bits of the residue are used to indicate one of four linked lists. The first residue pair [R0, P00] indicates that the first linked list (LL0) 1402 has a first entry (L00) located at P00. The second residue pair [R1, P10] indicates that the second linked list (LL1) 1403 has a first entry (L10) located at P10. The third residue pair [R2, P20] indicates that the third linked list (LL2) 1404 has a first entry (L20) located at P20. The fourth residue pair [R3, P30] indicates that the fourth linked list (LL3) is null 1405, it has no entries. A value can be stored in LL3 using the fourth residue pair as an entry point. The residue pairs can be a table with the residue bits indicating positions in the table. As an example, R0, R1, R2, and R3 can indicate locations 0, 1, 2, and 3 in a table of pointers. P00, P10, P20, and P30 can be stored in location 0, 1, 2, and 3, respectively.

Figure 15:
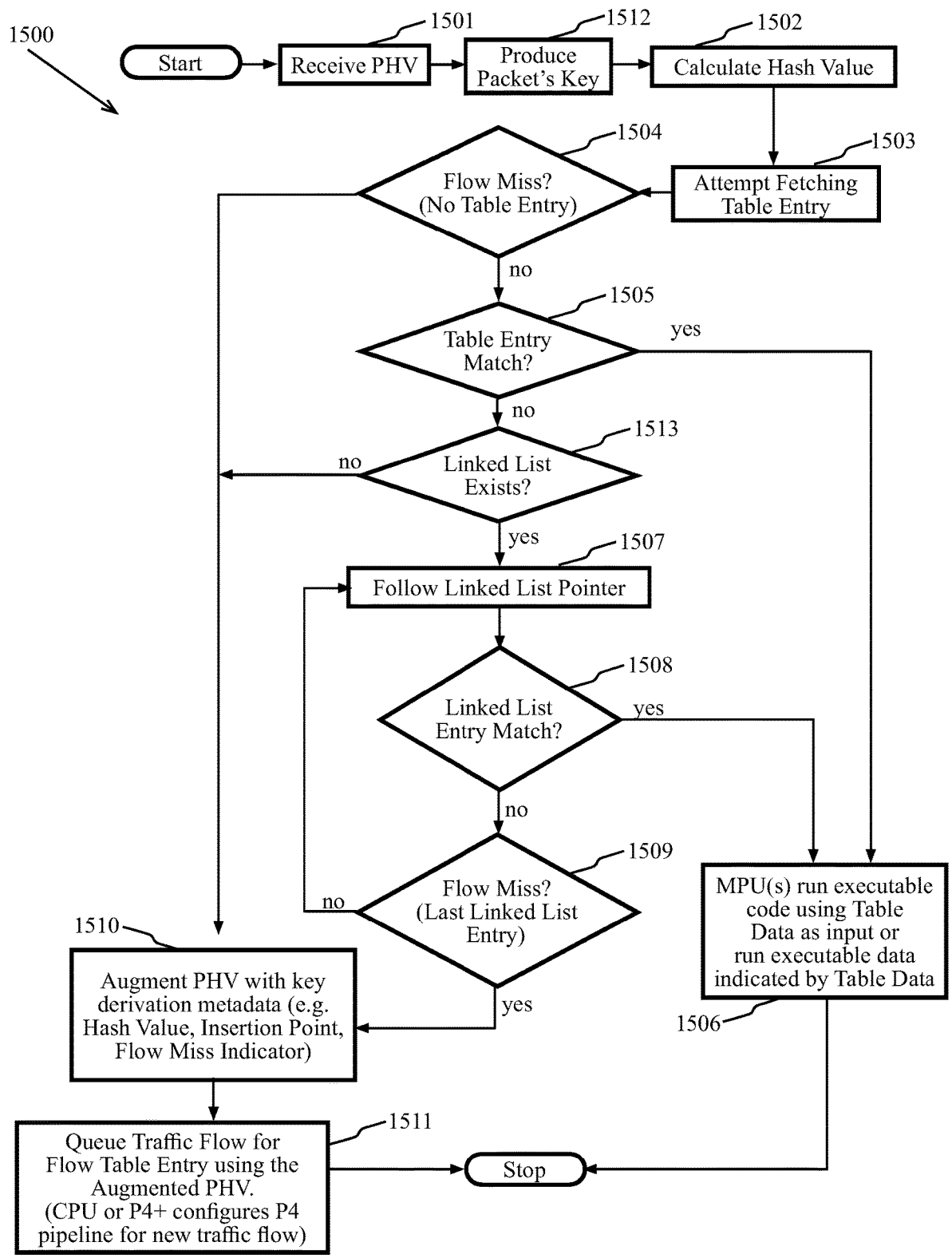
FIG. 15 is a high-level flow diagram of a table engine processing a packet header vector according to some aspects.

FIG. 15 is a high-level flow diagram 1500 of P4 match-action unit processing a packet header vector according to some aspects. A packet has been received at by the parser of a P4 pipeline. The parser generates a PHV from the packet header. The table engine of a P4 match-action unit then attempts to locate a table entry for the PHV and to either provide table data to the MPUs or generate a flow miss. The entirety of the illustrated process can be performed within a P4 pipeline. The illustrated process of FIG. 15 is a non-limiting example.

A PHV from a packet is received 1501. A key, such as the packet 5-tuple, is produced from the PHV 1512 and a hash value is calculated from the key at block 1502. The hash value can contain an index and a residue. The hash algorithm can be CRC-32. At block 1503, a table entry can be fetched using the index to locate a value in the table. If the table stores a value at the index location then the value is fetched. If no value is stored at the index location, a flow miss occurs.

If a value is returned, no flow miss is detected at block 1504. At block 1505, the key produced at block 1502 can be compared to the key in the returned value. If the comparison at block 1505 indicates the returned value's key matches the packet's key, the table data in the returned value can be sent to the MPUs 1506 which then process the packet. A table hit can locate the table data. The table data can include one or more values, such as a session Id, that can be input to executable code that is executed for each table hit. Alternatively, the table data can indicate a set of instructions that are to be executed. Yet another alternative is that the table data can indicate a set of instructions to be executed and can also contain input values for that set of instructions.

If the comparison at block 1505 indicates the returned value's key does not match the packet's key, then the value can be checked for a valid pointer (e.g. non-null) to a linked list 1513. If there is a valid pointer, then a linked list exists and the pointer can be followed to the first linked list entry at block 1507 and a value can be obtained from the first linked list entry. At block 1508, the packet's key, produced at block 1512, is compared to the key in the value obtained from the linked list. If the comparison at block 1508 indicates a match, the table data in the value obtained from the linked list can be sent to the MPUs 1506 which then process the packet.

If the comparison at block 1508 indicates no match, the process can continue to block 1509. At block 1509, the pointer to the next linked list entry is checked for validity (e.g. valid if not null). As discussed above the returned values from table lookups and linked list entries contain linked list pointers. If the linked list pointer is valid, the process can loop back to following the link pointer at block 1507. If the linked list pointer is not valid, a flow miss is detected.

If a flow miss is detected at block 1504 or block 1509, the PHV can be augmented with key derivation metadata 1510. The key derivation metadata can include the hash value and the insertion point. The key derivation metadata can also include a flag or other indicator of the flow miss. At block 1512, a CPU or a P4+ pipeline can configure the P4 pipeline to process the traffic flow.

It is important to observe that in its normal course of operations, the P4 pipeline calculates the key and hash value for every PHV it receives and that the P4 pipeline discovers the insertion point for every flow miss. Augmenting the PHV with the key derivation metadata simply places data that would otherwise be discarded (and later recalculated by the CPUs or extended P4 pipelines) into the PHV.

At block 1511, the traffic flow can be queued for flow table entry using the augmented PHV. In some aspects, the augmented PHV can be placed in an input queue for the CPUs. As such, the CPUs can use the key derivation metadata to configure the P4 pipeline for the new traffic flow. In some other embodiments, an extended P4 pipeline, such as the extended packet processing pipeline of FIGS. 7 and 10, can use the key derivation metadata to configure the P4 pipeline for the new traffic flow. As discussed above, the value contains the hash value and the insertion point. Without the key derivation metadata, the CPU or extended P4 pipeline may need to recalculate the hash value and determine the insertion point. Determining the insertion point can involve reads into the memory of the P4 pipeline which can slow down the P4 pipeline due to contention in accessing the P4 pipeline memory. It is wasteful for the CPUs or P4+ pipeline to determine the key derivation metadata when that data has already been determined by the P4 pipeline.

Figure 16:
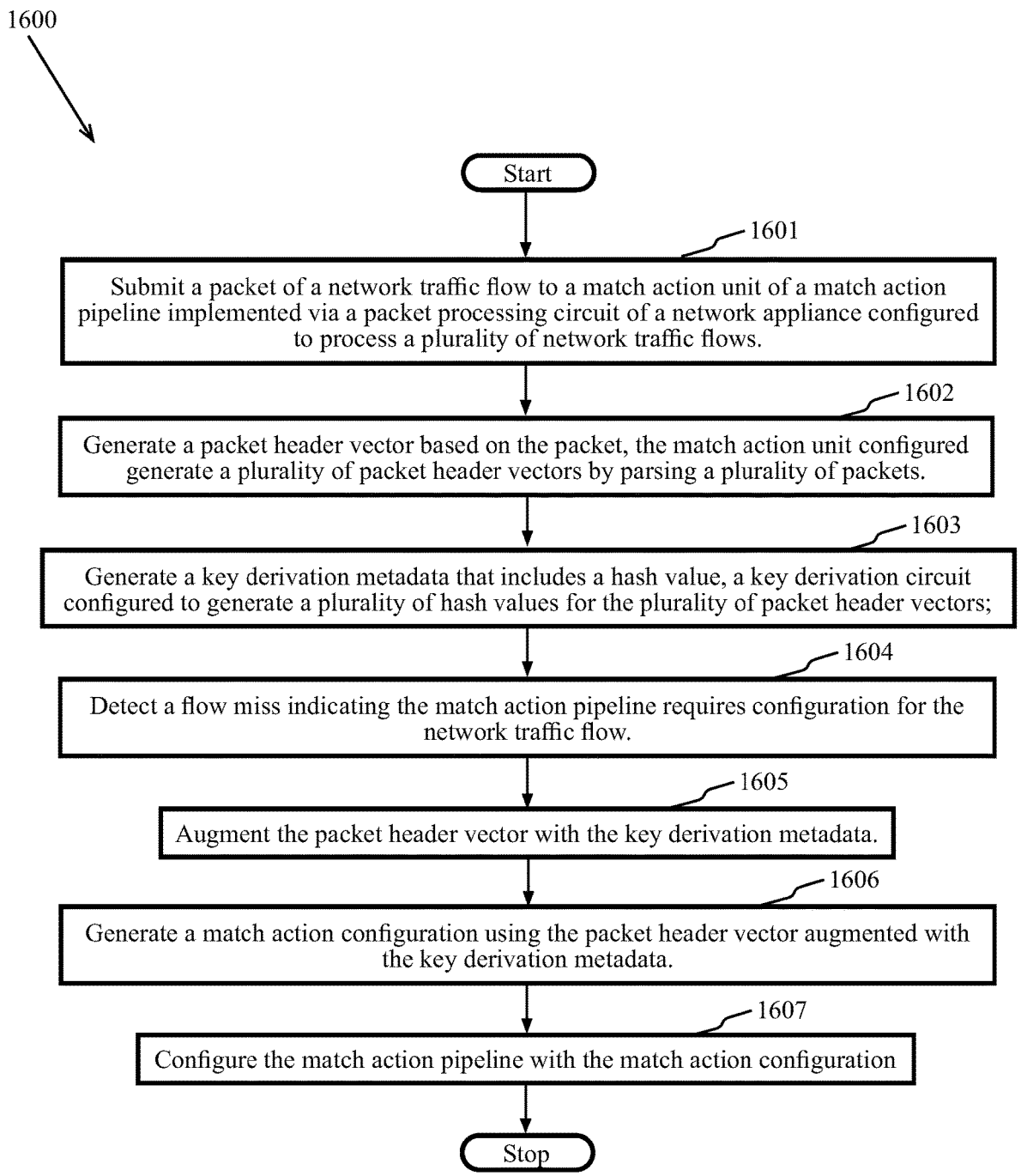
FIG. 16 is a high-level flow diagram of using pipeline flow miss metadata for facilitating flow table programming according to some aspects.

FIG. 16 is a high-level flow diagram of using pipeline flow miss metadata for facilitating flow table programming according to some aspects. At block 1601, a packet of a network traffic flow is submitted to a match-action unit of a match-action pipeline. The match-action pipeline can be implemented via a packet processing circuit of a network appliance configured to process a plurality of network traffic flows.

At block 1602, a packet header vector is generated based on the packet. The match-action unit can be configured generate a plurality of packet header vectors by parsing a plurality of packets. At block 1603, key derivation metadata is generated. The key derivation metadata can include a hash value. A key derivation circuit, such as the table engine or hash generator, can be configured to generate a plurality of hash values from the plurality of packet header vectors. At block 1604, a flow miss is detected. The flow miss indicates that the match-action pipeline requires configuration for the network traffic flow. At block 1605, the packet header vector is augmented with the key derivation metadata. At block 1606, a match-action configuration is generated using the packet header vector augmented with the key derivation metadata. At block 1607, the match-action pipeline is configured with the match-action configuration.

As discussed above, the packets of a traffic flow cause a flow miss if the match-action pipeline is not configured to process the traffic flow. As such, the packets of new traffic flows cause flow misses. Also as discussed above, the match-action pipelines can be programmable via a domain-specific language such as P4 to implement various operations at the data plane such as, for example, routing, bridging, tunneling, forwarding, network access control lists (ACLs), Layer 4 (L4) firewalls, flow-based rate limiting, VLAN tag policies, group membership, isolation, multicast, group control, label push/pop operations, L4 load-balancing, L4 flow tables for analytics and flow specific processing, distributed denial of service (DDoS) attack detection, DDoS attack mitigation, and telemetry data gathering on any packet field or flow state. Policy changes, programming changes, and other events can result in a need to change the processing of traffic flows for which the pipeline is currently configured. As such, traffic flows, perhaps thousands or millions of a pipeline's currently configured traffic flows, can be expired or removed due to one or more policy change, programming changes, and other events. A traffic flow that has been expired or removed from a pipeline is treated as a new traffic flow because the P4 pipeline is no longer configured to process it. Every packet for every new traffic flow causes a flow miss. The flow miss packets can be queued in a CPU receive queue such that the CPUs can configure the pipelines to process the traffic flows. It is therefore clear that the CPU receive queues can receive bursts of flow miss packets. Offloading some of the CPUs processing of flow miss packets to an extended packet processing pipeline can significantly improve the connections per second that a network appliance can perform. The network appliance of FIG. 7 can be configured to implement the burst queues.

Figure 17:
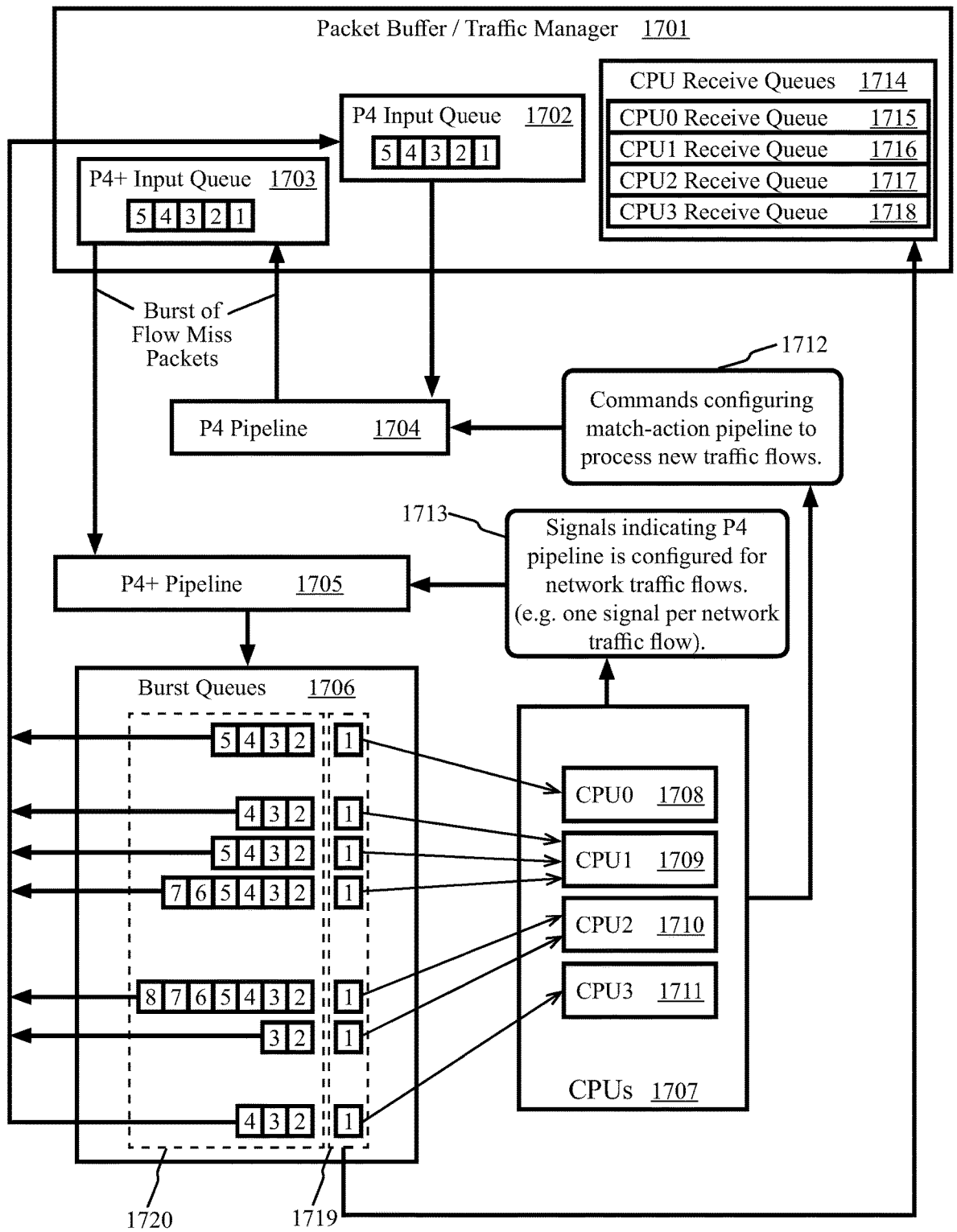
FIG. 17 is a high-level block diagram of an extended packet processing pipeline implementing burst handling assist via burst queues and CPU offload according to some aspects.

FIG. 17 is a high-level block diagram of an extended packet processing pipeline implementing burst handling assist via burst queues 1706 and CPU offload according to some aspects. A network appliance can include a packet buffer 1701, a match-action pipeline 1704, an extended match-action pipeline 1705, and CPUs 1707. In the non-limiting example of FIG. 17, the match-action pipeline is a P4 pipeline and the extended packet processing pipeline is a P4+ pipeline. The packet buffer 1701 can contain queues of packets. P4 input queue 1702 is an input queue for the match-action pipeline. P4+ input queue 1703 is an input queue for the extended packet processing pipeline. CPU receive queues 1714 includes receive queues for each of the CPUs 1707. CPU0 receive queue 1715 is the CPU receive queue for CPU0 1708. CPU1 receive queue 1716 is the CPU receive queue for CPU1 1709. CPU2 receive queue 1717 is the CPU receive queue for CPU2 1710. CPU3 receive queue 1718 is the CPU receive queue for CPU3 1711. The extended packet processing pipeline can maintain and control burst queues 1706 for the flow miss packets. A packet that causes a flow miss in the match-action pipeline 1704 is a flow miss packet. As discussed above, the P4 input queue may contain entire packets while other queues may hold PHVs while the packet payloads are placed in a different queue or otherwise held in memory. It is understood that a packet may be placed on a queue by placing its PHV on a queue and that a packet may be processed by processing its PHV. It is also understood that a packet on a queue can be the packet with its PHV prepended.

Packets received by a network appliance can be placed in the P4 input queue 1702 for processing, or flow miss, by the P4 pipeline 1704. The match-action pipeline 1704 can be configured to send flow miss packets to the P4+ input queue 1703. The P4+ pipeline can place the flow miss packets into burst queues 1706. Numerous packets for new traffic flows can be received by the network appliance. The first packets 1719 of the traffic flows can be moved to the CPU receive queues 1714 while the additional packets 1720 are held in the burst queues 1706. The CPUs 1707 can process the first packets 1719 to thereby produce match-action configurations for the traffic flows. The CPUs can then issue commands for configuring the match-action pipeline with the match-action configuration 1712. After configuring the P4 pipeline 1704 for a network traffic flow, a signal 1713 can be sent to the P4+ pipeline 1705 indicting that the P4 pipeline 1704 has been configured for that network traffic flow. Upon receiving the signal, the P4+ can move the additional packets for that particular network traffic flow to the P4 input queue 1702.

The essence of the example of FIG. 17 is that the first packet of a new flow can be processed by the CPUs to thereby configure the P4 pipeline to process the new traffic flow. The additional packets for the new flow are held in a burst queue until the P4 pipeline is configured for the new flow, then moved to the P4 input queue 1702. As such, the additional packets bypass the CPU receive queues. In some embodiments, the CPUs may fully process the first packets 1719 such that the first packets are not moved to the input queue of the match-action pipeline after the pipeline is configured for the new flow. In other embodiments, the first packets 1719 are moved to the input queue of the match-action pipeline after the pipeline is configured for the new flow. A packet can be moved from one queue to another queue either directly or other indirectly. For example, the first packet of a new flow may be moved directly from a burst queue to a CPU receive queue, may be moved directly from an input queue of a match-action pipeline to a CPU receive queue, or may be moved directly from a match-action pipeline directly to a CPU receive queue. In another example, a packet can be moved from the P4 input queue 1702 to a burst queue via the P4+ input queue 1703.

The non-limiting example of FIG. 17 has four CPUs and four CPU receive queues. Embodiments having a single CPU can move all the first packets 1719 to a single CPU receive queue. Embodiments having multiple CPUs can select which CPU is to process which new traffic flow. The CPU can be selected using a hash value calculated based on some or all of the data in a PHV. For example, a CRC-32 value can be calculated from the packet 5-tuple. Embodiments having four CPUs can use two bits of the hash value to select a CPU. For example, the two least significant bits (LSBs) of the hash value can be interpreted as the CPU number of the selected CPU. (e.g. "01" interpreted to send the packet to the CPU1 receive queue 1716.

Figure 18:
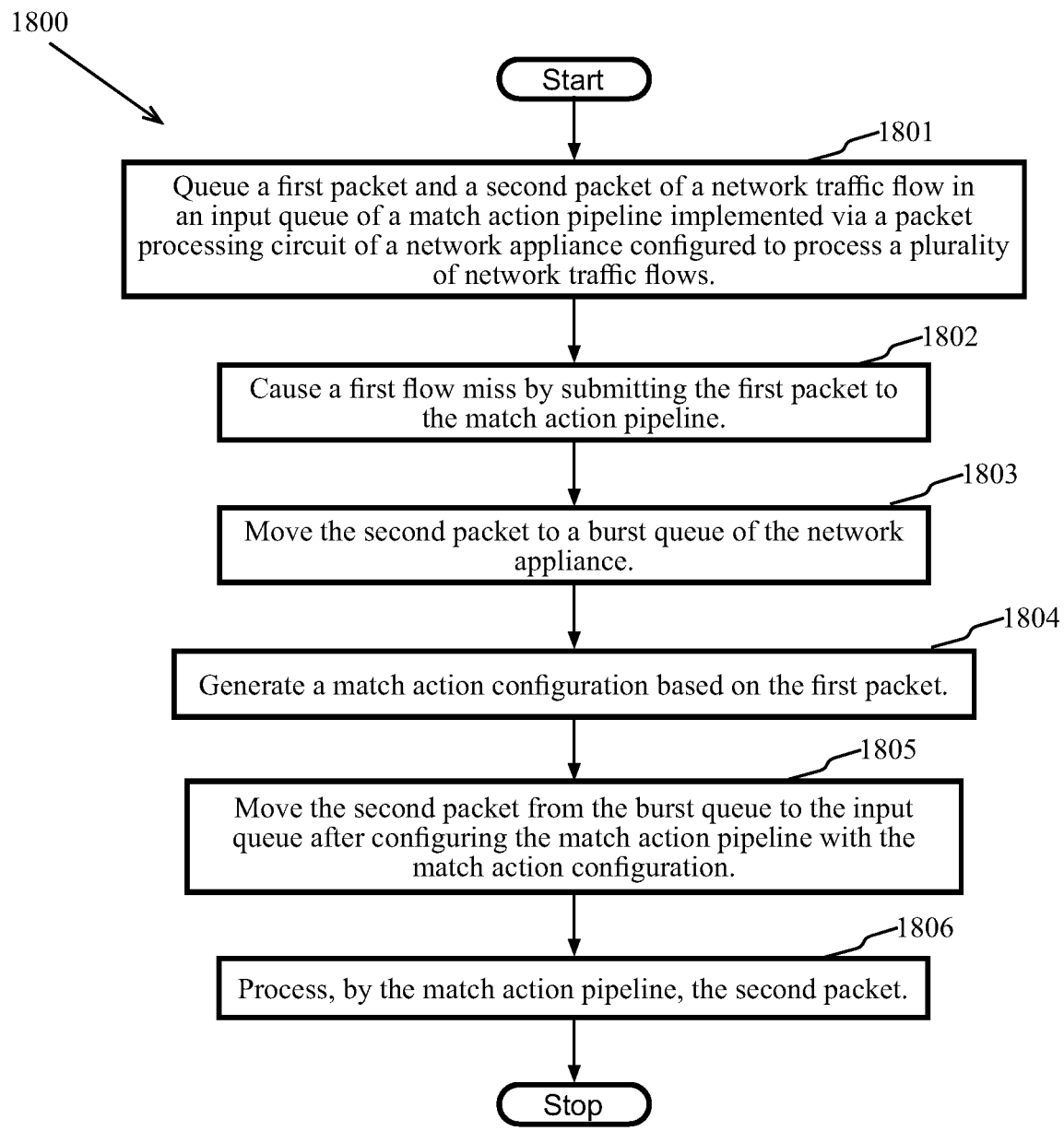
FIG. 18 is a high-level flow diagram of burst handling assist via burst queues and CPU offload according to some aspects.

FIG. 18 is a high-level flow diagram 1800 of burst handling assist via burst queues and CPU offload according to some aspects. At block 1801, a first packet and a second packet of a network traffic flow are queued in an input queue of a match-action pipeline implemented via a packet processing circuit of a network appliance configured to process a plurality of network traffic flows. The second packet can be one of the packets of the network traffic flow other than the first packet. At block 1802, a first flow miss is caused by submitting the first packet to the match-action pipeline. The flow miss can be caused because the network traffic flow is a new flow. At block 1803, the second packet is moved to a burst queue of the network appliance. At block 1804, a match-action configuration is generated based on the first packet. At block 1805, the second packet is moved from the burst queue to the input queue after configuring the match-action pipeline with the match-action configuration. At block 1806, the match-action pipeline processes the second packet.

Figure 19:
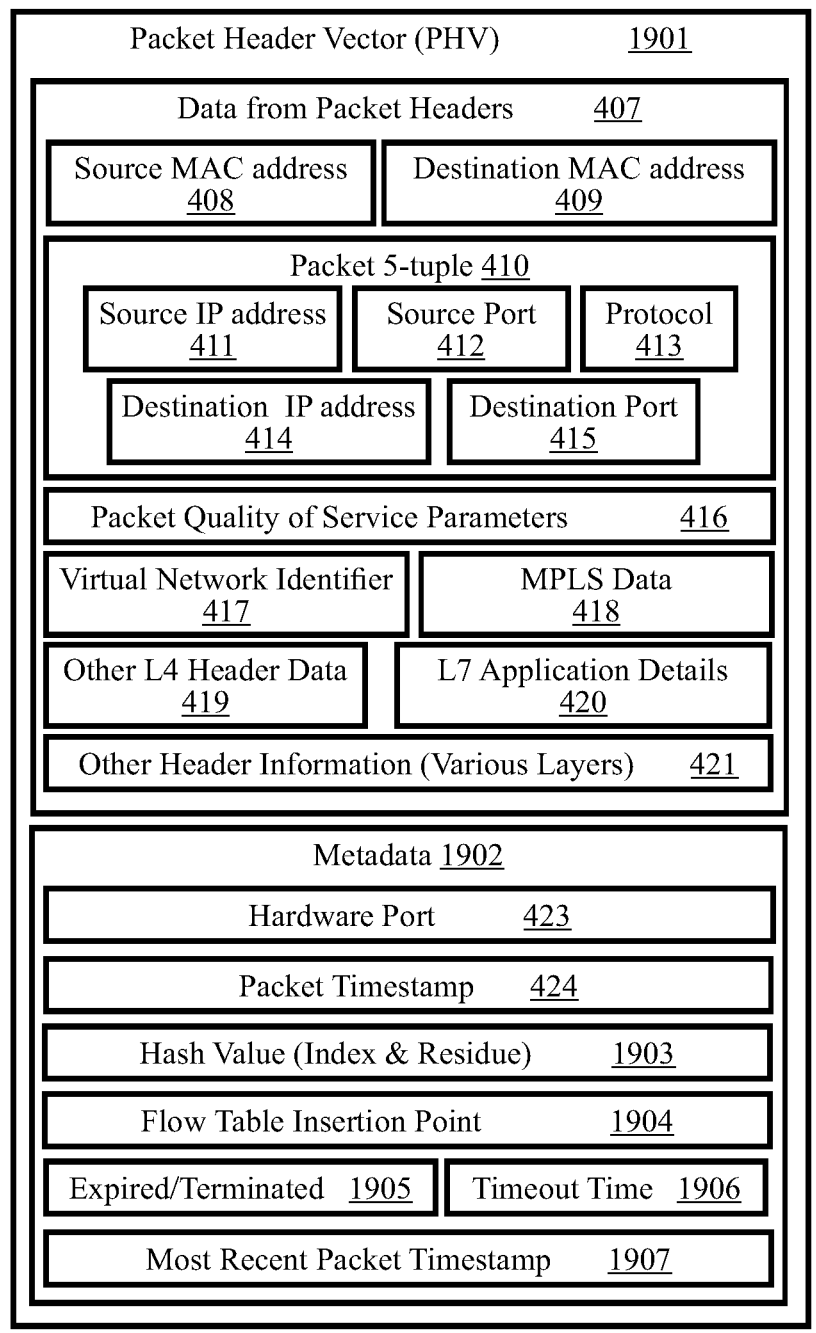
FIG. 19 illustrates a packet header vector augmented with additional metadata according to some aspects.

FIG. 19 illustrates a packet header vector 1901 augmented with additional metadata according to some aspects. PHV 1901 contains many of the same fields as PHV 406 of FIG. 4. PHV 1901 is augmented with key derivation metadata including hash value 1903 and flow table insertion point 1904. As discussed above, the hash value 1903 can be the key 1203 in a value 1205. The hash value 1903 can include an index 1208 and residue 1207. The PHV 1901 is also augmented with an expired/terminated flag 1905 that can indicate that the traffic flow associated with the PHV is expired or terminated.

The hash value 1903 can be a forward flow hash value for a forward flow of a traffic flow. A network traffic flow between a first machine and a second machine using a layer 4 protocol such as TCP can have a forward flow and a reverse flow. A PHV for the forward flow can have a source IP address indicating the first machine and a destination IP address indicating the second machine. A PHV for the reverse flow could therefore have a source IP address indicating the second machine and a destination IP address indicating the first machine. A PHV can be augmented with keys for both flows. The key derivation metadata can therefore include a forward flow hash value for the forward flow of the network traffic flow and a reverse flow hash value for the reverse flow of the network traffic flow.

The PHV 1901 is also augmented with a timeout time value 1906 and a most recent packet timestamp 1907. In practice a PHV may have either a timeout time value 1906 or a most recent packet timestamp 1907. A non-limiting example of using the timeout time value 1906 is as follows. The traffic flow associated with the PHV may be considered expired or timed out when the current time is later than the timeout time value 1906. When a new packet is received for the traffic flow, the timeout time value 1906 can be set to the current time plus a time period (e.g. 1 second, 5 seconds, or a value based on a property or type of the traffic flow). A non-limiting example of using most recent packet timestamp 1907 is as follows. The most recent packet timestamp 1907 is set to the current time each time a new packet for the traffic flow associated with the PHV is received. The traffic flow associated with the PHV may be considered expired or timed out when the current time is later than the recent packet timestamp 1907 plus a time period (e.g. 1 second, 5 seconds, or a value based on a property or type of the traffic flow).

Figure 20:
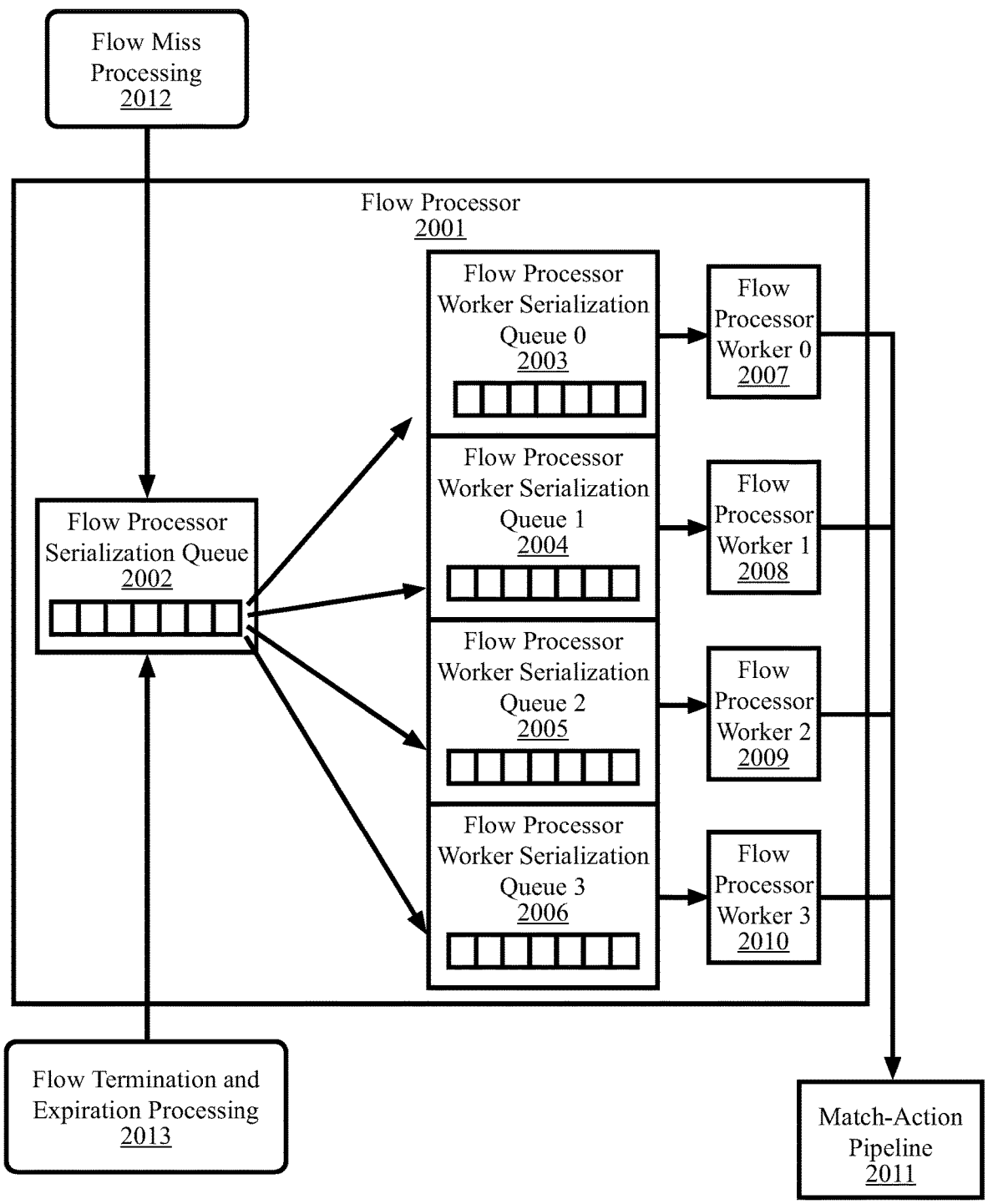
FIG. 20 illustrates a high-level diagram of a flow processor according to some aspects.

FIG. 20 illustrates a high-level diagram of a flow processor according to some aspects. As discussed above, race conditions can occur when two new flows have the same index. Additional packet flows can occur when multiple match-action pipeline configuration operations are queued for a single hash bucket and those operations are performed out of order. Here, a hash bucket can refer to all of the flow table entries having the same index. The race condition is that match-action pipeline configuration operation s may be performed out of order when they can be performed in parallel. Processing operations in parallel (e.g. multiple CPUs processing multiple operations at the same time), however, is desired in order to perform more operations over a given time (e.g. more connections per second). Serialization queues can serialize a plurality of match-action operations to thereby prevent race conditions. A flow processor can configure a match-action pipeline to process traffic flows, to remove traffic flows, etc. The flow processor can be implemented by the NIC 700 of FIG. 7 via its CPUs, extended packet processing pipelines, etc.

The flow processor 2001 of FIG. 20 is a non-limiting example of a flow processor having four flow processor workers 2007, 2008, 2009, 2010. Flow miss processing 2012 can generate match-action pipeline configuration operations for configuring a match-action pipeline 2011 to process new network traffic flows. Flow expiration and termination processing 2013 can generate match-action pipeline configuration operations for deleting network traffic flows from the match-action pipeline 2011. The match-action pipeline configuration operations can be entered into the flow processor serialization queue 2002 of a flow processor 2001. The flow processor workers 2007, 2008, 2009, 2010 can work in parallel to perform the operations. Each worker can have a worker serialization queue. Operations for flow processor worker 0 2007 can be queued on flow processor serialization queue 0 2003. Operations for flow processor worker 1 2008 can be queued on flow processor serialization queue 1 2004. Operations for flow processor worker 2 2009 can be queued on flow processor serialization queue 2 2005. Operations for flow processor worker 3 2010 can be queued on flow processor serialization queue 3 2006.

The flow processor worker for a particular match-action pipeline configuration operation can be selected based on a value calculated from the PHV such as the index 1208 in the key 1903 in the PHV 1901. Embodiments having four flow processor workers can use two bits of the index to select a flow processor worker. For example, the two least significant bits (LSBs) of the index can be interpreted as the flow processor worker number of the selected flow processor worker. If the bits are "00", then the operation can be entered into flow processor serialization queue 0 2003. If the bits are "01", then the operation can be entered into flow processor serialization queue 1 2004. If the bits are "10", then the operation can be entered into flow processor serialization queue 2 2005. If the bits are "11", then the operation can be entered into flow processor serialization queue 3 2006.

Using bits from the index ensures that match-action pipeline configuration operations for a particular hash bucket are performed by the same flow processor worker. Placing those operations on a serialization queue for that flow processor worker ensures that the operations are performed in order. More or fewer flow processor workers can be used, each having a serialization queue such that operations for a particular hash bucket are always performed in order by the same flow processor worker.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
   queueing a first packet and a second packet of a network traffic flow in an input queue of a match-action pipeline implemented via a packet processing circuit of a network appliance configured to process a plurality of network traffic flows;
   causing a first flow miss by submitting the first packet to the match-action pipeline;
   moving the second packet to a burst queue of the network appliance;
   generating a match-action configuration based on the first packet;
   moving the second packet from the burst queue to the input queue after configuring the match-action pipeline with the match-action configuration; and
   processing, by the match-action pipeline, the second packet,
   wherein the second packet is moved from the burst queue to the input queue by an extended packet processing pipeline.

2. The method of claim 1, further comprising:
   redirecting the first packet to a CPU receive queue wherein a CPU core is configured to generate the match-action configuration.

3. The method of claim 2, wherein the first packet is moved to the CPU receive queue via the burst queue.

4. The method of claim 1 further comprising:
   submitting a first packet header vector based on the first packet to an extended packet processing pipeline implemented via a pipeline circuit; and
   submitting a second packet header vector based on the second packet to the extended packet processing pipeline.

5. The method of claim 2, wherein an extended packet processing pipeline is configured to implement a plurality of burst queues that include the burst queue.

6. The method of claim 1 further comprising:
   generating a packet header vector from the first packet;
   producing a hash value using the packet header vector; and
   selecting the burst queue using a plurality of bits of the hash value, the network appliance configured to implement a plurality of burst queues.

7. The method of claim 1 wherein the second packet is moved to the burst queue after causing a second flow miss in the match-action pipeline.

8. The method of claim 1 wherein a policy change causes the first packet and the second packet to be sent to the burst queue.

9. The method of claim 1 wherein the match-action pipeline is a p4 pipeline.

10. A method comprising:
    submitting a packet of a network traffic flow to a match-action unit of a match-action pipeline implemented via a packet processing circuit of a network appliance configured to process a plurality of network traffic flows;

generating a packet header vector based on the packet, the match-action unit configured generate a plurality of packet header vectors by parsing a plurality of packets;

generating a key derivation metadata that includes a hash value, a key derivation circuit configured to generate a plurality of hash values for the plurality of packet header vectors;

detecting a flow miss indicating the match-action pipeline requires configuration for the network traffic flow;

augmenting the packet header vector with the key derivation metadata;

generating a match-action configuration using the packet header vector augmented with the key derivation metadata; and configuring the match-action pipeline with the match-action configuration.

11. The method of claim 10, wherein the network appliance includes a CPU core configured to generate the match-action configuration using the packet header vector augmented with the key derivation metadata.

12. The method of claim 10, wherein the key derivation metadata includes a forward flow hash value for a forward flow of the network traffic flow.

13. The method of claim 10, wherein the key derivation metadata includes a reverse flow hash value for a reverse flow of the network traffic flow.

14. The method of claim 10 further comprising:
avoiding a race condition between the match-action configuration and a second match-action configuration via a flow entry state data, the network appliance configured to implement the flow entry state data.

15. The method of claim 10, wherein the network appliance includes an extended packet processing pipeline implemented via a pipeline circuit, and the extended packet processing pipeline is configured to generate the match-action configuration using the packet header vector augmented with the key derivation metadata.

16. The method of claim 15, wherein the extended packet processing pipeline is configured to write traffic flow management data to a memory via a direct memory access operation, the memory used by at least one CPU core of the network appliance.

17. The method of claim 10, further comprising:
queueing a match-action pipeline configuration operation on a serialization queue, the network appliance configured to implement a plurality of serialization queues and to serialize a plurality of match-action operations via the plurality of serialization queues; and configuring the match-action pipeline with the match-action configuration by processing the match-action pipeline configuration operation.

18. The method of claim 10, wherein the match-action pipeline is a P4 pipeline.

19. The method of claim 10, further comprising:
queueing the packet and a second packet of the network traffic flow in an input queue of the match-action pipeline;

moving the second packet to a burst queue of the network appliance after detecting the flow miss;

moving the second packet from the burst queue to the input queue after configuring the match-action pipeline with the match-action configuration; and processing, by the match-action pipeline, the second packet.

20. A network appliance configured to process a plurality of network traffic flows, the network appliance comprising:
a packet processing circuit implementing a match-action pipeline; and
a burst queue,
wherein the network appliance is configured to:
receive a first packet and a second packet of a network traffic flow,
cause a flow miss by submitting the first packet to the match-action pipeline,
place the second packet on the burst queue,
generate a match-action configuration based on the first packet, and
process the second packet using the match-action pipeline after configuring the match-action pipeline with the match-action configuration.

* * * * *